(12) United States Patent
Duminuco et al.

(10) Patent No.: US 9,426,176 B2
(45) Date of Patent: Aug. 23, 2016

(54) METHOD, SYSTEM, AND LOGIC FOR IN-BAND EXCHANGE OF META-INFORMATION

(71) Applicant: CISCO TECHNOLOGY, INC., San Jose, CA (US)

(72) Inventors: Alessandro Duminuco, Milan (IT); Hendrikus G. P. Bosch, Aalsmeer (NL); Surendra M. Kumar, San Ramon, CA (US); Humberto J. La Roche, Ocean, NJ (US); Jeffrey Napper, Delft (NL); Kevin D. Shatzkamer, Hingham, MA (US); Daniel G. Wing, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 14/520,118

(22) Filed: Oct. 21, 2014

(65) Prior Publication Data
US 2015/0271204 A1  Sep. 24, 2015

Related U.S. Application Data

(60) Provisional application No. 61/968,888, filed on Mar. 21, 2014.

(51) Int. Cl.
*H04L 29/06* (2006.01)
*H04L 29/08* (2006.01)

(52) U.S. Cl.
CPC .......... *H04L 63/166* (2013.01); *H04L 63/0281* (2013.01); *H04L 63/0435* (2013.01); *H04L 63/168* (2013.01); *H04L 67/02* (2013.01); *H04L 67/42* (2013.01)

(58) Field of Classification Search
CPC .................................................. H04L 63/0428
USPC .......................................................... 713/151
See application file for complete search history.

(56) References Cited

U.S. PATENT DOCUMENTS

6,115,384 A * 9/2000 Parzych ................. H04L 29/06
370/401
6,799,270 B1   9/2004 Bull et al.
(Continued)

OTHER PUBLICATIONS

U.S. Appl. No. 14/521,856, filed Oct. 23, 2014, entitled "Method, System, and Logic for In-Band Exchange of Meta-Information," Inventors: Alessandro Duminuco, et al.

(Continued)

*Primary Examiner* — Taghi Arani
*Assistant Examiner* — Khalil Naghdali
(74) *Attorney, Agent, or Firm* — Patent Capitol Group

(57) ABSTRACT

In an embodiment, a method is provided for enabling in-band data exchange between networks. The method can comprise receiving, by a first enveloping proxy located in the first network, at least one regular secure sockets layer (SSL) record for a SSL session established between a client and a server; receiving the data from a network element located in the first network; encoding the data into at least one custom SSL record; and transmitting the at least one regular SSL record and the at least one custom SSL record to an enveloping proxy. In another embodiment, a method can comprise receiving at least one regular secure sockets layer (SSL) record and at least one custom SSL record for a SSL session established between a client and a server; extracting the data from the at least one custom SSL; transmitting the at least one regular SSL record.

21 Claims, 8 Drawing Sheets

(56) References Cited

U.S. PATENT DOCUMENTS

| | | | |
|---|---|---|---|
| 7,333,990 B1 | 2/2008 | Thiagarajan | |
| 8,601,152 B1 * | 12/2013 | Chou | H04L 63/0428 709/236 |
| 8,700,892 B2 | 4/2014 | Bollay | |
| 8,762,707 B2 * | 6/2014 | Killian | H04L 9/0825 380/44 |
| 2003/0023879 A1 | 1/2003 | Wray | |
| 2006/0005240 A1 * | 1/2006 | Sundarrajan | H04L 63/0272 726/15 |
| 2010/0318784 A1 | 12/2010 | Rao et al. | |
| 2011/0235508 A1 | 9/2011 | Goel | |
| 2011/0264905 A1 | 10/2011 | Ovsiannikov | |
| 2014/0119367 A1 * | 5/2014 | Han | H04L 12/4633 370/389 |
| 2015/0106624 A1 * | 4/2015 | Gero | H04L 9/0825 713/171 |
| 2015/0271203 A1 | 9/2015 | Duminuco et al. | |
| 2015/0271205 A1 | 9/2015 | Duminuco et al. | |

OTHER PUBLICATIONS

U.S. Appl. No. 14/522,064, filed Oct. 23, 2014, entitled "Method, System, and Logic for In-Band Exchange of Meta-Information," Inventors: Alessandro Duminuco, et al.

Boucadair, et al., "Analysis of Potential Solutions for Revealing a Host Identifier (HOST_ID) in Shared Address Deployments," Internet Engineering Task Force (IETF), RFC 6967, Jun. 2013, 24 pages; http://tools.ietf.org/pdf/rfc6967.pdf.

Freier, et al., "The Secure Sockets Layer (SSL) Protocol Version 3.0," Internet Engineering Task Force (IETF), RFC 6101, Aug. 2011, 67 pages; http://tools.ietf.org/pdf/rfc6101.pdf.

Lesniewski-Laas, et al., "SSL splitting: securely serving data from untrusted caches," Laboratory for Computer Science, Massachusetts Institute of Technology, First published on or about Aug. 30, 2008, 13 pages; http://pdos.csail.mit.edu/papers/ssl-splitting-usenixsecurity03.pdf.

Snell, "HTTP/2.0 Discussion: Binary Optimized Header Encoding," Network Working Group, Internet Draft, Expires Aug. 22, 2013, Feb. 18, 2013, 8 pages; http://tools.ietf.org/pdf/draft-snell-httpbis-keynego-02.pdf.

Yourtchenko, et al., "Revealing hosts sharing an IP address using TCP option," Network Working Group, Internet Draft, Expires Jun. 10, 2012, Dec. 8, 2011, 10 pages; http://tools.ietf.org/pdf/draft-wing-nat-reveal-option-03.pdf.

Williams, et al., et al., "Overlay Path Option for IP and TCP," Network Working Group, Internet Draft, Expires Dec. 21, 2013, Jun. 19, 2013, 17 pages; http://tools.ietf.org/pdf/draft-williams-overlaypath-ip-tcp-rfc 04.pdf.

USPTO Mar. 7, 2016 Non-Final Office Action from U.S. Appl. No. 14/522,064.

* cited by examiner

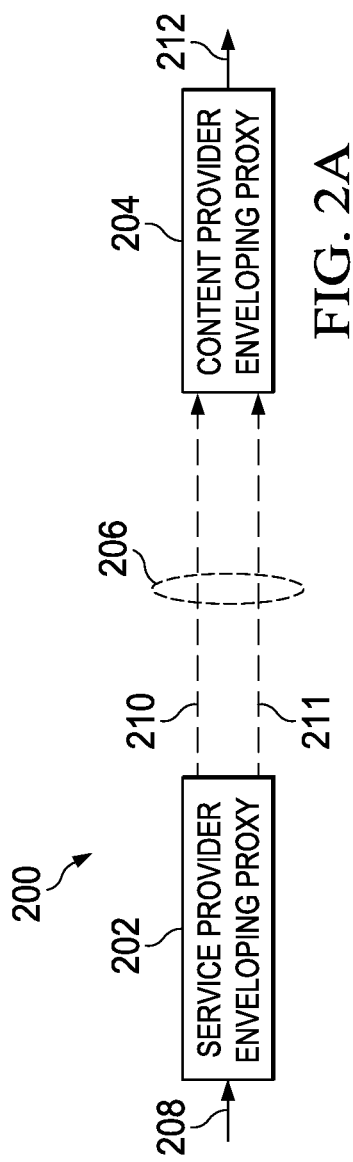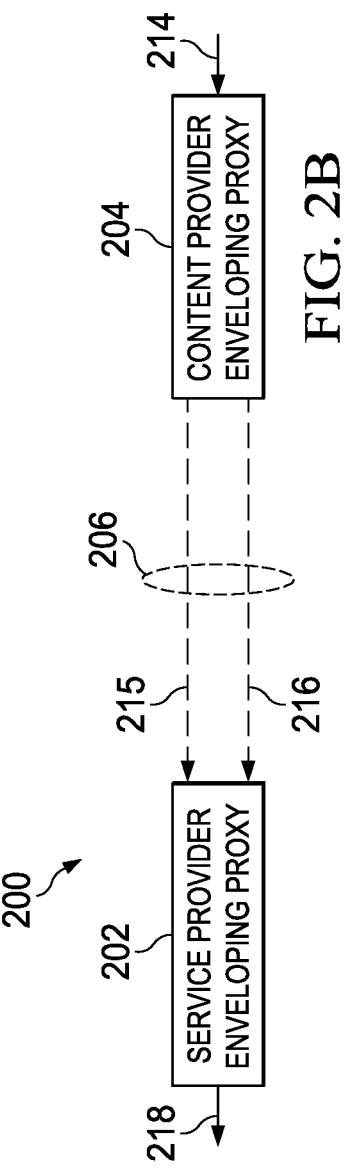

US 9,426,176 B2

METHOD, SYSTEM, AND LOGIC FOR IN-BAND EXCHANGE OF META-INFORMATION

CROSS-REFERENCE TO RELATED APPLICATIONS

This application claims the benefit of priority under 35 U.S.C. §119(e) to U.S. Provisional Application Ser. No. 61/968,888, entitled "IN-BAND META-INFORMATION EXCHANGE BETWEEN MOBILE SERVICE PROVIDER AND CONTENT PROVIDER" filed Mar. 21, 2014, which is hereby incorporated by reference in its entirety.

TECHNICAL FIELD

This disclosure relates in general to the field of communications and, more particularly, to enabling in-band exchange of meta-information between networks (e.g., between a (mobile) service provider network and a content provider network).

BACKGROUND

Mobile service providers' infrastructure provides the access network for subscribers exchanging data with content companies. This puts mobile service providers in the position to offer useful services to content companies. Such services may fall in the following broad categories (1) maintaining meta-information about the subscribers and the subscriber access network; (2) offering access to network functions as service; and/or (3) offering infrastructure services to content providers. Mobile service providers maintain meta-information about the subscribers and the subscriber access network, which are useful to content providers to provide better services. Such information may be offered to content providers and includes, for example, subscriber identity, radio channel condition, subscriber geo-location, subscriber usage pattern etc. Mobile service providers may offer access to network functions as service to content provider. For example, if content companies need prioritized access to the mobile subscriber they can request the mobile service provider to "uplift" Quality of Service (QoS) settings for particular 5-tuple flows (i.e., data flows identified by source IP address, destination IP address, source port number, destination port number and the protocol) and have these 5-tuple flows mapped to specific, QoS improved, dedicated bearers maintained towards the mobile devices. Mobile service providers may offer infrastructure services to content providers and host content provider applications in the service provider infrastructure. These applications include, among others, data caches, video transcoders, ad insertion engine etc.

All these services require the content provider and the mobile service provider to exchange data related to the specific subscriber flows (data flow), which traverse both their networks. Several examples include: mobile service providers need to expose meta-information to content providers; content providers need to access an Application Programming Interface (API) exposed by mobile service providers to activate offered services; and content provider applications hosted in the service provider network may need to exchange data with their content providers and, therefore, the mobile service provider needs to provide a communication channel to enable this exchange. For example, if data flows are encrypted, a content server may need to provide the hosted applications with session encryption keys or Secure Sockets Layer (SSL) certificates. It is important that such data is exchanged in-band, i.e. embedded in the subscriber data flow they refer to. However, providing such data in-band can be challenging.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A and 2B illustrate an exemplary system for enabling in-band data exchange between two or more enveloping proxies according to some embodiments of the disclosure.

DETAILED DESCRIPTION OF EXAMPLE EMBODIMENTS

Overview

Figure 1:
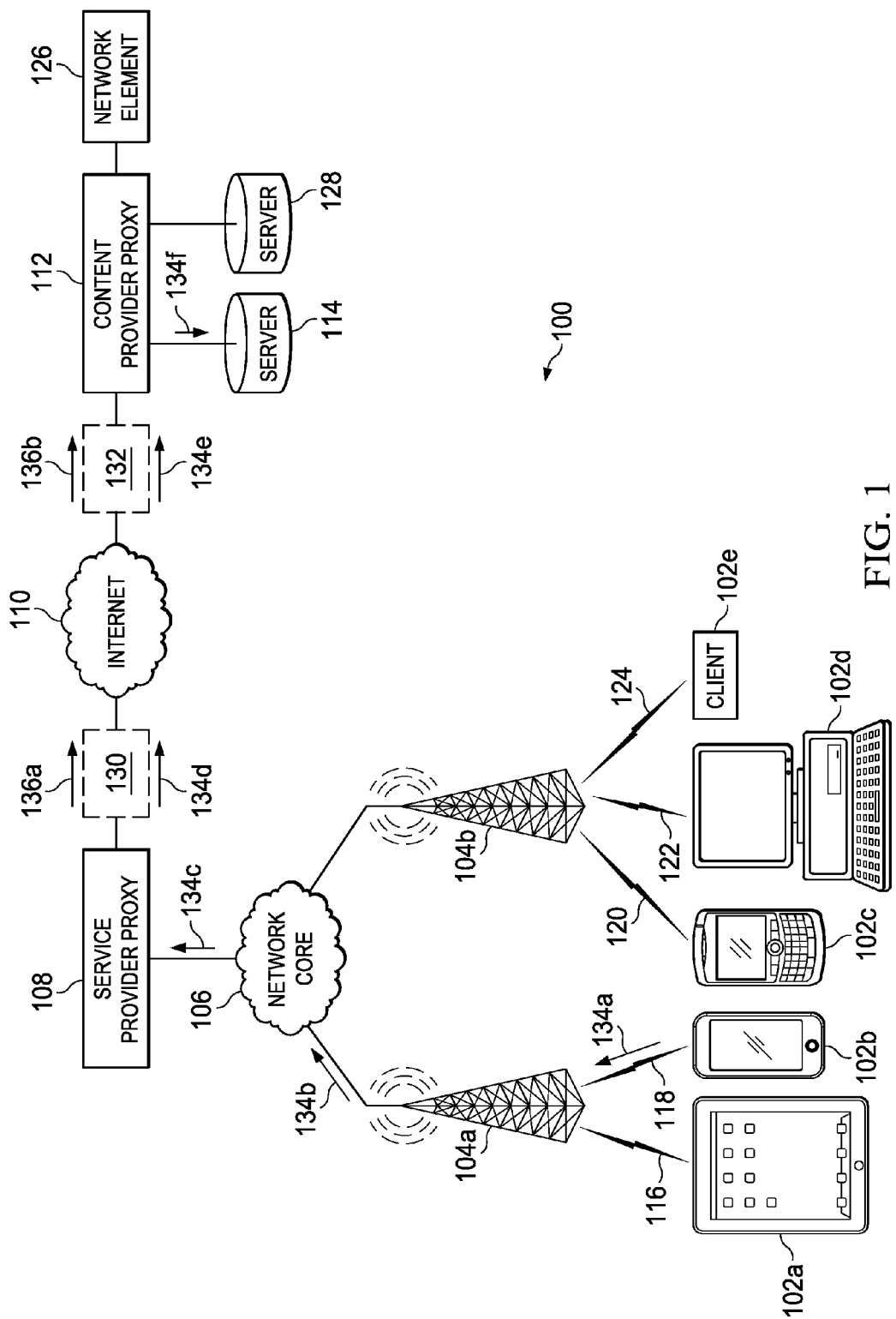
FIG. 1 illustrates a system for communication between a service provider network and a content provider network, according to an embodiment of the present disclosure.

Mobile service providers can offer many profitable services to content providers by exchanging subscriber flow (i.e., data flow) related meta-data (metadata) with such content providers. Meta-data information is exchanged in-band to make the related flow-identification resilient to Network Address (Port) Translator (NA(P)T) appliances, content provider's load balancers present in the network, and/or other systems that translate network addresses. In-band data exchange is not possible if subscriber flows are encrypted and, currently, the share of encrypted data flows observed in mobile network is quickly rising. This disclosure proposes the definition of custom SSL record types to carry the meta-data. This method allows in-band meta-data exchange within SSL encrypted data flows without the service provider having access to encrypted data or to session encryption keys for the data flow.

The following examples relate to some embodiments of the present disclosure.

Example 1 is a method for communication between a first network and a second network, the method comprising: receiving, by a first enveloping proxy located in the first network, at least one regular secure sockets layer (SSL) record for a SSL session established between a client and a server; receiving, by the first enveloping proxy, data from a network element located in the first network; encoding, by the first enveloping proxy, the data into at least one custom SSL record; and transmitting the at least one regular SSL record and the at least one custom SSL record from the first enveloping proxy to a second enveloping proxy located in the second network.

In Example 2, the subject matter of Example 1 can optionally include: wherein encrypted data within the at least one regular SSL record is to be decrypted only by the server.

In Example 3, the subject matter of Example 1 or 2 can optionally include: wherein the transmitting the at least one regular SSL record and the at least one custom SSL record comprises interleaving the at least one regular SSL record and the at least one custom SSL record over a data connection between the first enveloping proxy and the second enveloping proxy.

In Example 4, the subject matter of any of Examples 1-3 can optionally include wherein the receiving the data from the network element located in the first network comprises receiving the data over an out-of-band channel between the network element and the first enveloping proxy.

In Example 5, the subject matter of any of Examples 1-4 can optionally include wherein the first network is a service provider network, the first enveloping proxy is a service provider enveloping proxy, the second network is a content provider network, the second enveloping proxy is a content provider enveloping proxy, and the server is a content server.

In Example 6, the subject matter of any of Examples 1-5 optionally include wherein the first network is a content provider network, the first enveloping proxy is a content provider enveloping proxy, the second network is a service provider network, the second enveloping proxy is a service provider enveloping proxy, and the server is a content server.

Example 7 is a system for communication between a first network and a second network, the system comprising: at least one memory element; at least one processor coupled to the at least one memory element; and a data encoding module, on a first enveloping proxy, that when executed by the at least one processor is configured to: receive at least one regular secure sockets layer (SSL) record for a SSL session established between a client and a server; receive data from a network element located in the first network; encode the data into at least one custom SSL record; and transmit the at least one regular SSL record and the at least one custom SSL record from the first enveloping proxy to the second enveloping proxy.

In Example 8, the subject matter of Example 7 can optionally include: wherein encrypted data within the at least one regular SSL record is to be decrypted only by the server.

In Example 9, the subject matter of Example 7 or 8 can optionally include: wherein the transmitting the at least one regular SSL record and the at least one custom SSL record comprises interleaving the at least one regular SSL record and the at least one custom SSL record over a data connection between the first enveloping proxy and the second enveloping proxy.

In Example 10, the subject matter of any of Examples 7-9 can optionally include wherein the receiving the data from the network element located in the first network comprises receiving the data over an out-of-band channel between the network element and the first enveloping proxy.

In Example 11, the subject matter of any of Examples 7-10 can optionally include wherein the first network is a service provider network, the first enveloping proxy is a service provider enveloping proxy, the second network is a content provider network, the second enveloping proxy is a content provider enveloping proxy, and the server is a content server.

In Example 12, the subject matter of any of Examples 7-11 optionally include wherein the first network is a content provider network, the first enveloping proxy is a content provider enveloping proxy, the second network is a service provider network, the second enveloping proxy is a service provider enveloping proxy, and the server is a content server.

Example 13 is one or more non-transitory tangible media for communication between a first network and a second network, the one or more non-transitory tangible media including code for execution and when executed by a processor operable to perform operations comprising: receiving, by a first enveloping proxy located in the first network, at least one regular secure sockets layer (SSL) record for a SSL session established between a client and a server; receiving, by the first enveloping proxy, data from a network element located in the first network; encoding, by the first enveloping proxy, the data into at least one custom SSL record; and transmitting the at least one regular SSL record and the at least one custom SSL record from the first enveloping proxy to a second enveloping proxy located in the second network.

In Example 14, the subject matter of Example 13 can optionally include: wherein encrypted data within the at least one regular SSL record is to be decrypted only by the server.

In Example 15, the subject matter of Example 13 or 14 can optionally include: wherein the transmitting the at least one regular SSL record and the at least one custom SSL record comprises interleaving the at least one regular SSL record and the at least one custom SSL record over a data connection between the first enveloping proxy and the second enveloping proxy.

In Example 16, the subject matter of any of Examples 13-15 can optionally include wherein the receiving the data from the network element located in the first network comprises receiving the data over an out-of-band channel between the network element and the first enveloping proxy.

In Example 17, the subject matter of any of Examples 13-16 can optionally include wherein the first network is a service provider network, the first enveloping proxy is a service provider enveloping proxy, the second network is a content provider network, the second enveloping proxy is a content provider enveloping proxy, and the server is a content server.

In Example 18, the subject matter of any of Examples 13-17 optionally include wherein the first network is a content provider network, the first enveloping proxy is a content provider enveloping proxy, the second network is a service provider network, the second enveloping proxy is a service provider enveloping proxy, and the server is a content server.

Example 19 is a method for communication between a first network and a second network, the method comprising: receiving, by a first enveloping proxy from a second enveloping proxy, at least one regular secure sockets layer (SSL) record and at least one custom SSL record for a SSL session established between a client and a server, wherein the first enveloping proxy is located in the first network and the second enveloping proxy is located in the second network; extracting, by the first enveloping proxy, data from the at least one custom SSL; transmitting the at least one regular SSL record from the first enveloping proxy to the server.

In Example 20, the subject matter of Example 19 can optionally include: wherein encrypted data within the at least one regular SSL record is to be decrypted only by the server.

In Example 21, the subject matter of Example 19 or 20 can optionally include: wherein the receiving the at least one regular SSL record and the at least one custom SSL record comprises receiving at least one regular SSL record interleaved with the at least one custom SSL over a data connection between the first enveloping proxy and the second enveloping proxy.

In Example 22, the subject matter of any of Examples 19-21 can optionally include transmitting the data to the server.

In Example 23, the subject matter of any of Examples 19-22 can optionally include wherein the first network is a service provider network, the first enveloping proxy is a service provider enveloping proxy, the second network is a content provider network, and the second enveloping proxy is a content provider enveloping proxy.

In Example 24, the subject matter of any of Examples 19-23 can optionally include wherein the first network is a content provider network, the first enveloping proxy is a content provider enveloping proxy, the second network is a service provider network, and the second enveloping proxy is a service provider enveloping proxy.

Example 25 is a system for communication between a first network and a second network, the system comprising: at least one memory element; at least one processor coupled to the at least one memory element; and a data encoding module, on a first enveloping proxy, that when executed by the at least one processor is configured to: receive, from a second enveloping proxy, at least one regular secure sockets layer (SSL) record and at least one custom SSL record for a SSL session established between a client and a server, wherein the first enveloping proxy is located in the first network and the second enveloping proxy is located in the second network; extract, by the first enveloping proxy, data from the at least one custom SSL; transmit the at least one regular SSL record from the first enveloping proxy to the server.

In Example 26, the subject matter of Example 25 can optionally include: wherein encrypted data within the at least one regular SSL record is to be decrypted only by the server.

In Example 27, the subject matter of Example 25 or 26 can optionally include: wherein the receiving the at least one regular SSL record and the at least one custom SSL record comprises receiving at least one regular SSL record interleaved with the at least one custom SSL over a data connection between the first enveloping proxy and the second enveloping proxy.

In Example 28, the subject matter of any of Examples 25-27 can optionally include transmitting the data to the server.

In Example 29, the subject matter of any of Examples 25-28 can optionally include wherein the first network is a service provider network, the first enveloping proxy is a service provider enveloping proxy, the second network is a content provider network, and the second enveloping proxy is a content provider enveloping proxy.

In Example 30, the subject matter of any of Examples 25-29 can optionally include wherein the first network is a content provider network, the first enveloping proxy is a content provider enveloping proxy, the second network is a service provider network, and the second enveloping proxy is a service provider enveloping proxy.

Example 31 is one or more non-transitory tangible media for enabling in-band data exchange between a first network and a second network, the one or more non-transitory tangible media including code for execution and when executed by a processor operable to perform operations comprising: receiving, by a first enveloping proxy from a second enveloping proxy, at least one regular secure sockets layer (SSL) record and at least one custom SSL record for a SSL session established between a client and a server, wherein the first enveloping proxy is located in the first network and the second enveloping proxy is located in the second network; extracting, by the first enveloping proxy, the data from the at least one custom SSL; and transmitting the at least one regular SSL record from the first enveloping proxy to the server.

In Example 32, the subject matter of Example 31 can optionally include: wherein encrypted data within the at least one regular SSL record is to be decrypted only by the server.

In Example 33, the subject matter of Example 31 or 32 can optionally include: wherein the receiving the at least one regular SSL record and the at least one custom SSL record comprises receiving at least one regular SSL record interleaved with the at least one custom SSL over a data connection between the first enveloping proxy and the second enveloping proxy.

In Example 34, the subject matter of any of Examples 31-33 can optionally include transmitting the data to the server.

In Example 35, the subject matter of any of Examples 31-34 can optionally include wherein the first network is a service provider network, the first enveloping proxy is a service provider enveloping proxy, the second network is a content provider network, and the second enveloping proxy is a content provider enveloping proxy.

In Example 36, the subject matter of any of Examples 31-35 can optionally include wherein the first network is a content provider network, the first enveloping proxy is a content provider enveloping proxy, the second network is a service provider network, and the second enveloping proxy is a service provider enveloping proxy.

Example Embodiments

Exchanging meta-information between the mobile service provider and the content provider is challenging because any out-of-band mechanism would (a) introduce latency in the distribution of meta-data, which is sub-optimal for short-lived data flows, and (b) require both, the content provider and service provider to agree on the identification of the related subscriber data flow. This latter is non-trivial as the presence of Network Address (and Port) Translation (NAT, NAPT, or NA(P)T) functions between the content provider and the service provider and/or load balancing functions hosted in the content provider, causes the 5-tuple characterizing the data flows to be different at the two ends of the communication. Therefore, what the service provider systems, such as Long Term Evolution (LTE) Evolved Packet Core (EPC) and Operations Support System (OSS) systems (Policy and Charging Rules Function (PCRF), Home Subscriber Server (HSS), Online Charging Solution (OCS)), "see" does not always coincide with what the content provider "sees". In some examples, the provider system(s) is a Long Term Evolution (LTE) Evolved Packet Core (EPC) and Operations Support System (OSS) system (e.g., Policy and Charging Rules Function (PCRF), Home Subscriber Server (HSS), or Online Charging Solution (OCS))

Embedding meta-data into a non-encrypted data flow is trivial. In case of HTTP flows, for example, common business practice encodes such data in custom HTTP headers. When subscriber data flows are encrypted by means of SSL or any other encrypting mechanism, such "trivial" embedding is not possible without accessing session encryption keys. It is highly discouraged that content providers share session encryption keys with service providers as such sharing would violate the explicit trust relationship between subscriber and content provider. However, just as content providers need to ensure a trust relationship between the subscriber and themselves, a mechanism is needed to ensure a trust relationship between the content provider and service provider for meta-data exchange.

This disclosure discusses various methods to allow in-band meta-data exchange between service provider and content provider in the presence of SSL encrypted sessions, without breaking into the end-to-end encrypted channel. The service provider can piggyback on the existing end-to-end SSL session and insert their meta-data to go along with the encrypted data between subscriber and content provider. The methods, systems, and logic described herein provide, at least, the following advantages: allows in-band meta-data exchange within SSL encrypted flows; allows for meta-data to be carried in a subset of the flows forming the subscriber session due to subscriber awareness; does not hinder end-to-end security of SSL flows, as they do not require the content provider to access encrypted data; allows the content provider and the service provider to unequivocally identify the flow the service relates to even in presence of SSL flows or NA(P)T; does not rely on Internet Protocol (IP) or TCP header modification to carry meta-data as other methods propose. For this reason carried meta-data are resistant to NAT, application proxies, or firewalls present in the network; does not rely on a tunnel between the Service Provider (SP) and Content Provider (CP), which can subvert end-to-end TCP congestion control by encapsulating the subscriber TCP session inside another transport layer; and/or allows service provider to provide subscriber flows related services to content providers for SSL encrypted flows.

FIG. 1 illustrates a system (i.e., system 100) for communication between a service provider network and a content provider network, according to an embodiment of the present disclosure. System 100 comprises, among other things, a service provider (SP) network and a content provider (CP) network. The service provider network includes client devices 102*a-e*, network access elements 104*a-b*, network core 106, service provider enveloping proxy 108, and Network Address Translator (NAT) 130. The content provider network includes servers 114 and 128, network element 126, content provider enveloping proxy 112, and load balancer 132. The service provider network and the content provider network are operably coupled to one another by Internet 110. Each of the service provider enveloping proxy 108 and the content provider enveloping proxy 112 relays signals between the networks using Internet 110. When relaying the signals, each enveloping proxy can inject additional data into the signal thereby transmitting the additional data, in-band, to the other network (e.g., via the corresponding enveloping proxy located in the other network). In addition, each enveloping proxy can receive an augmented signal (i.e., the signal including the additional data, supplied in-band), extract the additional data from the augmented signal, and then relay the signal (i.e., a signal in which the additional data has been removed) and/or the additional data to one or more destinations.

The service provider network is to provide client devices with access to network services (e.g., data and/or voice, mobile service, or combination thereof). Client devices 102*a* and 102*b* utilize connections 116 and 118, respectively, to connect to network access element 104*a* thereby accessing the service provider network. Client devices 102*c*, 102*d*, and 102*e* utilize connections 120, 122, and 124, respectively, to connect to network access element 104*b* thereby accessing the service provider network. Each network access element is operably coupled to network core 106. Thus, each of network access element 104*a* and 104*b* provide the client devices with access to a network core 106 over the wireless connections.

The network core 106 includes one or more network elements (e.g., routers, switches, gateways, Serving Gateway, Packet Data Network Gateway, Mobility Management Entity, etc.) for processing voice signals and/or data signals ("traffic") and transmitting the traffic toward a destination associated with the traffic (e.g., a destination IP address included in a 5-tuple). For example, the network core 106 delivers traffic to and/or from the network edges (e.g., network elements 104*a* and 104*b*). In general, the network core 106 enables important functions for operation of the SP network (e.g., delivering data and/or voice over a mobile network, hosting applications, adjusting service parameters for one or more data flows, etc.). In addition to being coupled to network access element 104*a* and 104*b*, the network core 106 is coupled to service provider enveloping proxy 108. The service provider enveloping proxy 108 transmits signals to (and receives signals from) the content provider network via Internet 110. Enveloping proxy 108 can inject additional data (e.g., meta-data, function calls, data structures such as containers, etc.) into the signal and, thereby, transmit the additional data, in-band, to the other network (e.g., via the content provider enveloping proxy 112 located in the content provider network). In addition, the enveloping proxy 108 can receive an augmented signal (i.e., the signal including the additional data, supplied in-band), extract the additional data from the augmented signal, and then relay the signal and/or the additional data to one or more destinations (e.g., a client device and/or a hosted application within the service provider network).

Some embodiments of the present disclosure include NAT 130 within the service provider network of system 100. In alternative embodiments, NAT 130 is not present in (e.g., is excluded from or is not active) the service provider network. When the NAT is present in system 100, the NAT is connected to the Internet 110. Thus signals transmitted by the service provider enveloping proxy 108 toward the content provider network first traverse the NAT and are subsequently transmitted, by the NAT, to the content provider network via Internet 110. When traffic traverses NAT 130, the NAT modifies a network address (e.g., an IP address) and may therefore map a first 5-tuple (corresponding to a data flow) to second 5-tuple (which corresponds to the data flow). The NAT 130 transmits data via Internet 110 to the content provider network (e.g., via load balancer 132 and/or directly to content provider enveloping proxy 112). When the NAT is not present in system 10, the service provider enveloping proxy 108 is connected to the Internet 110. Thus signals transmitted network by the service provider enveloping proxy 108 toward the content provider traverse Internet 110 without first traversing the NAT.

The content provider (CP) network is to provide client devices with access to content (e.g., data, files, multimedia, etc.). The servers 114 and 128 may be content servers for providing content requested by clients (e.g., client devices 102*a-e*). The servers are coupled to a content provider enveloping proxy 112, the network element 126, and the load balancer 132. The CP enveloping proxy 112 may transmit signals to (and receive signals from) any of the devices to which it is coupled. Upon receiving a request for a particular content, the servers retrieve the content, and transmit a response toward the requesting client, for example, via CP enveloping proxy 112. Advantageously, the enveloping proxy 112 can inject additional data (e.g., meta-data, function calls, data structures such as containers, etc.) into the signal thereby transmitting the additional data, in-band, to the SP network (e.g., via the SP enveloping proxy 108). In addition, the enveloping proxy 112 can receive an augmented signal (i.e., the signal including the additional data, supplied in-band), extract the additional data from the augmented signal, and then relay the signal and/or the additional data to one or more destinations.

SSL protocol defines a layer on top of Transport Control Protocol (TCP) that encrypts all the application data exchanged between the two ends of the TCP connection. Upon TCP connection establishment (e.g., via TCP handshakes), the connection endpoints initiate a SSL handshake, by which they negotiate the encryption parameters to be used (e.g., via SSL handshakes). Once the handshake is completed, encrypted application data and other protocol-related information are exchanged. All the data exchanged within an SSL session are fragmented into basic units called SSL records. SSL records can be of different types and different size, however all record types include a common unencrypted header that specifies the particular type (i.e., SSL record type) and the size of the specific record. The type, called an SSL record type, is a numerical value that corresponds to the type of SSL record. For example, the SSL protocol defines the following SSL record types: Change Cipher Spec (type number 20), Alert (type number 21), Handshake (type number 22), and Application Data (type number 23).

An SSL connection may be established between a client (e.g., any of clients 102a-e) and a server (e.g., any of servers 114 and 128, or network element 126) for transmitting regular SSL records (e.g., with an SSL record type enumerated in the SSL protocol). In one example, the CP enveloping proxy 112 encodes meta-data into custom SSL records (e.g., with a custom SSL record type) for transmission to the service provider network (e.g., via SP enveloping proxy 108). The custom SSL records (generated by the CP enveloping proxy 112) may be interleaved with regular SSL records. The CP enveloping proxy 112 cannot access the secure or encrypted content within the regular SSL records. Thus, the generation (and interleaving) of the custom SSL records is performed without accessing session encryption keys for the regular SSL records. In addition, the generation (and interleaving) of the custom SSL records does not hinder end-to-end security of the flow of regular SSL records, as it does not require the content provider to access encrypted data within the regular SSL records.

Some embodiments of system 100 include load balancer 132 within the content provider network. In alternative embodiments, load balancer 132 is not present in (e.g., is excluded from or is not active) the content provider network. When the load balancer is present in system 100, the load balancer 132 is connected to the Internet 110. Thus signals transmitted by the content provider enveloping proxy 112 toward the service provider network first traverse the load balancer and are subsequently transmitted, by the load balancer, to the service provider network via Internet 110. When traffic traverses load balancer 132, the load balancer can modifies a network address (e.g., an IP address) to balance the amount of request for content delivered to each and may therefore map a first 5-tuple (corresponding to a data flow) to second 5-tuple (which corresponds to the data flow).

In some implementations, only NAT 130 is present in system 100. In other examples, only load balancer 132 is present in system 100. In still other examples, both NAT 130 and load balancer 132 are present. Alternatively, in other examples, neither NAT 130 nor load balancer 132 is present system 100.

Because the enveloping proxies (e.g., each of enveloping proxy 108 and 112) transmit the additional data interleaved with the encrypted regular SSL records of a data flow, meta-data is transmitted between the proxies without accessing session encryption keys for the data flow. Neither enveloping proxy 108 nor enveloping proxy 112 decrypts the encrypted regular SSL records of the data flow.

In operation, a client device utilizes the service provider network to access content stored in the content provider network. For example, a subscriber (e.g., an end user) may use one of the client devices to input a request for multimedia content from a server on the content provider network. In system 100, client device 102b generates a request to send to server 114 and transmits the request to the server thereby generating data flow 134 (i.e., 134a, 134b, 134c, 134d, 134e, 134f). The data flow 134 may be sent over an encrypted session between the client 102b and server 114. The session may be encrypted with any encryption mechanism. In the case of SSL encryption, a public key and a private key are used within the session. The public key is used to encrypt the data and the private key (which is kept private) is used to decrypt the data. When the client device 102b establishes a secure connection with server 114, server 114 (in the content provider network) stores the private key while client device 102 be uses the public key to encrypt the data. The content provider's private key should not be shared with the service provider, as such sharing would violate the explicit trust relationship between subscriber and content provider. In this example, the service provider enveloping proxy 108 does not have access to the content provider's private key (and therefore cannot decrypt SSL records that are encrypted by using the content provider's public key for the encryption). After the session is established, each stage of transmitting data flow (i.e., each of data flow portions 134a-f) uses the encrypted session to transmit regular (non-custom) SSL records that are encrypted by using the content provider's public key. SSL records can be of different types and different size, however all record types include a common unencrypted header that specifies the particular type and the size of the specific record. The type, called an SSL record type, is a numerical value that corresponds to the type of SSL record. For example, the SSL protocol defines the following SSL record types: Change Cipher Spec (type number 20), Alert (type number 21), Handshake (type number 22), and Application Data (type number 23). The regular SSL records contain only the SSL record types that are defined by the SSL Protocol (e.g., or other SSL record type defined in standards-based protocol). Regular SSL records 134a (e.g., for the request) are transmitted from device 102b to network element 104a via data connection 118 using the session. Upon receiving regular SSL records 134a, network element 1048 transmits the regular SSL records 134b to network core 106. In turn, the network core 106 transmits regular SSL records 134c to the service provider enveloping proxy 108. Upon receiving the regular SSL records 134c, service provider enveloping proxy 108 transmits regular SSL records 134d (and 134e) to the service provider enveloping proxy over a TCP connection established over Internet 110 (e.g., via NAT 130, if present and/or via load balancer 132, if present) thereby transmitting the request for content to the content provider network. Upon receiving regular SSL records 134e, content provider enveloping proxy 112 transmits regular SSL records 134f to the server 114 to complete the transmission of the request.

In this case, the service provider enveloping proxy 108 has access to meta-data associated with the data flow 134. For example, a network element (e.g., a device hosting an application) within network core 106 may transmit, to enveloping proxy 108, the meta-data including current Quality of Service (QoS) and network congestion information for the data flow 134. In turn, the service provider enveloping proxy 108 can share the meta-data with the content provider (i.e., transmit the meta-data to a network element with the CP network). For example, the service provider enveloping proxy 108 encodes the meta-data into at least one custom SSL record (e.g., records 136). The custom SSL records 136 are generated (e.g., encoded by an enveloping proxy) with a custom SSL record type in the header. In one example, a custom SSL record type is a SSL record type that is not defined by the SSL protocol (e.g., 99). The meta-data can include (or be represented as) a sequence of bits. The bits contained within the custom SSL records may or may not be encrypted. For encrypted custom SSL records, the custom SSL records are generating using an encryption key that is different from the encryption key used to encrypt the regular SSL records. Thus, the private key used to decrypt the custom SSL records does not decrypt the regular SSL records and, thereby, can be used while maintaining the security of the data contained within the regular SSL records (e.g., 134*d* and 134*e*). Service provider enveloping proxy 108 can transmit the meta-data encoded within the custom SSL records 136 (i.e., 136*a-b*). In addition, the service provider enveloping proxy 108 can transmit the custom SSL records 136 (which contain the meta-data) the data flow 134 (i.e., transmitted in-band). Thus, service provider enveloping proxy 108 transmits the regular SSL records (e.g., 134*d*) and the custom SSL records (e.g., 136*a*). For example, transmitting the regular SSL records and the custom SSL records comprises interleaving the regular SSL records and the custom SSL records over a data connection (e.g., the TCP connection over Internet 110) between the service provider enveloping proxy 108 (e.g., a first enveloping proxy) and the content provider enveloping proxy 112 (e.g., a second enveloping proxy). Thus, a single data connection may be used to transmit both the regular SSL records and the custom SSL records.

Content provider enveloping proxy 112 receives the custom and regular SSL records (e.g., interleaved with one anther) in a data flow from service provider enveloping proxy 108. The content provider enveloping proxy can identify which of the records are custom SSL records and which of the records are regular SSL records based on the SSL record type (e.g., identifying a custom SSL record type or a regular SSL record type, respectively). The custom SSL records are retrieved from the data flow. In the example of encrypted custom SSL, the enveloping proxy 112 uses a private key (established through a secure connection with enveloping proxy 108) to decrypt the custom SSL records thereby extracting the meta-data from the custom SSL records. If the custom SSL records are not encrypted, the data may be directly extracted from the custom SSL records without decryption. The extracted data (e.g., meta-data and/or containers) may be transmitted to the server 114 within the content provider network. In either case (whether the custom SSL records are encrypted or not), decryption of the custom SSL records is not decryption of the regular SSL records. In this case, the regular SSL records remain encrypted. The content provider proxy 112 transmits (e.g., relays) the regular SSL records to the server 114. When transmitting the regular SSL records to the server 114, the content provider proxy 112 strips the custom SSL records from the data flow. Thus, the data flow is forwarded only after having been modified by removing the custom SSL records.

In this example, records 134*a-f* are regular (i.e., non-custom) SSL records (e.g., at least one regular SSL record). The at least one regular SSL record is generated using the public key for the SSL session between the client (i.e., client 102*b*) and the server (i.e., server 114). The at least one regular SSL record can be decrypted using only the private key for the SSL session between the client and the server. Encrypted data within the at least one regular SSL record is to be decrypted only by the server (in this example, the server 114). The server is the only device with access to the private key (i.e., the content provider's private key for the SSL session). Thus, the encrypted data within the at least one regular SSL record can be decrypted only by the server (e.g., the server 114 in the content provider network). In other words, neither the service provider enveloping proxy 108 nor the content provider enveloping proxy 112 decrypts (nor is capable of decrypting) the at least one regular SSL record due, at least in part, to neither having access to a key that is required for decrypting the at least one regular SSL record. After the data is encoded (e.g., encrypted) within the at least one regular SSL record, the data is transmitted to the server via one or more intermediate nodes. Because only the server can decrypt the data in the at least one regular SSL record, the encrypted data within the at least one regular SSL record remains encrypted at all of the intermediate nodes between the client and the server. For example, the service provider enveloping proxy 108 (e.g., a first enveloping proxy) does not have access to encrypted data within the at least one regular SSL record. In addition, the content provider enveloping proxy 112 (e.g., a second enveloping proxy) does not have access to encrypted data within the at least one regular SSL record.

Records 136*a-b* are custom SSL records (e.g., at least one custom SSL record). The custom SSL records are used to transmit data (e.g., meta-data and/or containers) between the service provider network and the content provider network (via enveloping proxies 108 and 112). The data are carried (i.e., by the custom SSL records) in a subset of the flows (i.e., a subset located between proxies 108 and 112) forming a subscriber session (e.g., a session between client 102*b* and server 114). The data can be a sequence of bits (or include a sequence of bits). The bits contained within the custom SSL records may or may not be encrypted. For encrypted records, the at least one custom SSL record is generated (e.g., by enveloping proxy 108) using a public key for a SSL session between the service provider enveloping proxy 108 and the content provider enveloping proxy 112. In this example, the at least one custom SSL record can be decrypted (e.g., by enveloping proxy 112) using the private key for the SSL session between the service provider enveloping proxy 108 and the content provider enveloping proxy 112. For unencrypted records, the sequence of bits that represent the meta-data and/or containers may be transmitted unencrypted (i.e., "in the clear") within the custom SSL records. The generating and/or transmission of the at least one custom SSL record is performed without accessing the encrypted data within the at least one regular SSL record. For example, each of the following is performed without accessing the encrypted data within the at least one regular SSL record: (1) enveloping proxy 108 encodes data and/or containers within the at least one custom SSL record for transmission to enveloping proxy 112 without accessing the encrypted data within the at least one regular SSL record; (2) enveloping proxy 108 interleaves the at least one custom SSL record with the at least one regular SSL record during transmission to enveloping proxy 112; (3) enveloping proxy 112 receives the at least one custom SSL record interleaved with the at least one regular SSL record; (4) enveloping proxy 112 decrypts the at least one custom SSL record to retrieve the data and/or the container (5) enveloping proxy 112 transmits the at least one regular SSL record to server 114, and (6) enveloping proxy 112 transmits, to server 114, the data and/or the container retrieved from the at least one custom SSL record.

As disclosed herein, an enveloping proxy (located in a first network) receives regular (i.e., non-custom) SSL records from a network element (e.g., from a client device and/or server). The enveloping proxy transmits (e.g., forwards) the regular SSL records, over a TCP connection, to another enveloping proxy located in a second network (which is separate and different from the first network). For example, a data flow (e.g., sent using a TCP connection) can include the regular SSL records for an SSL session established between a client and a server. In this example, the enveloping proxy is an intermediate device (node) between the client and the server that forwards the regular SSL records. In addition to transmitting the regular SSL records, the enveloping proxy can send data, in-band, by encoding the data into custom SSL records for interleaving with the regular SSL records.

The enveloping proxy is not able to access the secure contents of the regular SSL records because it does not have access to the private key needed to decrypt the SSL records. However, the enveloping proxy may receive data (e.g., meta-data and/or one or more containers) about the data flow to which the regular SSL records belong. In some examples, the enveloping proxy may access the data from data store or may receive the data from another network component (e.g., a network component that generates statistics such as bandwidth of the links traversed by the SSL records or battery life of client device from which SSL records originated). The enveloping proxy encodes the data into custom SSL records. The custom SSL records are then sent within the data flow (e.g., sent with the regular SSL records over the TCP connection). In some cases, the enveloping proxy interleaves the regular and the custom SSL records with one another when sending them, e.g., over the TCP connection to the enveloping proxy located in the second network. The enveloping proxy advantageously uses the custom SSL records to transmit the data (e.g., meta-data and/or one or more containers) to the second network. The enveloping proxy modifies the data flow to encapsulate its own meta-data and/or containers. Thus, the meta-data is embedded within the data flow that it describes. In other words, the enveloping proxy can encode (encrypt) data into custom SSL records (e.g., using a custom SSL type) for transmission with other (regular) SSL records, wherein the data is sent within a data flow that it describes. An enveloping proxy, as disclosed herein, is not limited to encoding and/or sending data in custom SSL records. As will be discussed further below, an enveloping proxy can extract the data from custom SSL records received from another enveloping proxy (thereby receiving in-band data).

FIGS. 2A and 2B illustrate an exemplary system (system 200) for enabling in-band data exchange between two or more enveloping proxies (e.g., one in a first network and another in a second network) according to an embodiment of the present disclosure. System 200 comprises service provider enveloping proxy 202, content provider enveloping proxy 204, and data connection 206. The service provider enveloping proxy 202 and the content provider enveloping proxy 204 communicate over the data connection 206 (e.g., a TCP connection). For example, in FIG. 2A, the service provider enveloping proxy receives input 208 (which may include one or more inputs). The service provider enveloping proxy 202 generates (e.g., based on at least a portion of input 208) SSL records 211 to contain data for transmission to the content provider enveloping proxy 204. The service provider enveloping proxy 202 transmits regular SSL records 210 and the custom SSL records 211 over the data connection 206 to the content provider enveloping proxy 204. In turn, the content provider enveloping proxy 204 generates output 212 (which may include one or more outputs). In FIG. 2B, the content provider enveloping proxy 204 receives input 214 (which may include one or more inputs). The content provider enveloping proxy 204 generates custom SSL records 216 (e.g., based on at least a portion of input 214) to contain data for transmission to the service provider enveloping proxy 202. The content provider enveloping proxy 204 transmits regular SSL records 215 and the custom SSL records 216 over the data connection 206 to the service provider enveloping proxy 202. In turn, the service provider enveloping proxy 202 generates output 218 (which may include one or more outputs).

As shown in FIG. 2A, service provider enveloping proxy 202 receives one or more inputs represented by input 208. The one or more inputs 208 may comprise one or more regular SSL records data for an SSL connection. Upon receiving the regular SSL records, service provider enveloping proxy 202 forwards the unmodified regular SSL records 110 over the data connection 206. The one or more inputs 208 may comprise meta-data and/or containers (e.g., in addition to the regular SSL records). In some cases, the meta-data and/or containers are received from the same network component that sent the regular SSL records. In other cases, the meta-data and/or containers and the regular SSL records are received from different sources. In still other cases, the service provider enveloping proxy 202 may generate the meta-data and/or containers. In each of these cases, the service provider enveloping proxy 202 generates custom SSL records 211 to include the meta-data and/or containers. Generating the custom SSL records 211 can include one or more of generating the SSL records, splitting the data into chunks that fit within an SSL record (for distributing into multiple SSL records), setting an SSL record type (within a header) to a custom type, etc. After the custom SSL records 211 are generated, the enveloping proxy 202 transmits the custom SSL records 211 interleaved with the regular SSL records 210 over the data connection 206 and, thereby, transmits the meta-data and/or containers, in-band, to enveloping proxy 204.

Upon receiving regular SSL records 210 and custom SSL records 211 over data connection 206, content provider enveloping proxy 204 identifies which of the SSL records are regular SSL records and which of the SSL records are custom SSL records based on the SSL record type. For example, enveloping proxy 204 can identify regular SSL records based on the SSL record type matching one that is enumerated in the SSL Protocol (and/or not matching a custom SSL record type). Enveloping proxy 204 can identify custom SSL records based on the SSL record type matching a custom SSL record type (and/or not matching one enumerated in the SSL Protocol). The custom SSL types may be stored in memory accessible to the enveloping proxy 204 for comparison to SSL types in headers of received records. In some examples, the content provider and service provider agree on a particular custom SSL type (e.g., 99) to correspond to custom SSL records used to transmit meta-data and/or containers.

The content provider enveloping proxy 204 processes the SSL records to generate output 212. The output 212 can include one or more outputs. Upon identifying the regular SSL records, enveloping proxy 204 transmits (forward) the regular SSL records as one of the one or more outputs included in output 212. The content provider enveloping proxy 204 forwards each of the regular SSL records as output 212 (e.g., to a network component). In addition, upon identifying the custom SSL records, the enveloping proxy 204 extracts the custom SSL records from SSL data connection 206. The extracted custom SSL records are processed, by enveloping proxy 204, to generate the meta-data and/or containers (e.g., reconstruct the meta-data and/or containers sent by enveloping proxy 202) from the data contained in the custom SSL records. In one example, the enveloping proxy 204 generates the data by decrypting the data using a private key for the custom SSL records. Note that the private key for the custom SSL records only allows decryption of the custom SSL records and does not allow decryption the regular SSL records. After decrypting data from the custom SSL records, enveloping proxy 204 can accesses and/or modify the data. If data is received in chunks, the chunks are aggregated and may, for example, use a checksum to verify that data was received without errors. After the data has been generated from the custom SSL records, the enveloping proxy transmits the data (in whole or in part) as one of the one or more outputs included in output 212. The one or more outputs included in output 212 are transmitted over one or more interfaces. In an embodiment, the regular SSL records (i.e., a first portion of output 212) are sent in an SSL session over a TCP connection (e.g., a first interface) to a server. The meta-data and/or containers generated from the custom SSL records (i.e., a second portion of output 212) are sent through an out-of-band (i.e., is not sent in-band) interface (e.g., a second interface) to the server and/or another network component.

In FIG. 2A, enveloping proxy 202 encodes the custom SSL records and enveloping proxy 204 receives the encoded records sent by enveloping proxy 202. However, in FIG. 2B, enveloping proxy 204 encodes data into custom SSL records and enveloping proxy 202 receives the encoded records sent by enveloping proxy 204.

As shown in FIG. 2B, content provider enveloping proxy 204 receives one or more inputs represented by input 214. The one or more inputs may comprise one or more regular SSL records data for an SSL connection. Upon receiving the regular SSL records, service provider enveloping proxy 202 forwards the unmodified regular SSL records 215 over the data connection 206. The one or more inputs may comprise meta-data and/or containers (e.g., in addition to the regular SSL records). In some cases, the meta-data and/or containers are received from the same network component that sent the regular SSL records. In other cases, the meta-data and/or containers and the regular SSL records are received from different sources. In still other cases, the content provider enveloping proxy 204 may generate the meta-data and/or containers. In each of these cases, the content provider enveloping proxy 204 generates custom SSL records 216, in which to include the meta-data and/or containers. Generating the custom SSL records 216 can include one or more of generating the SSL records, splitting the data into chunks that fit within an SSL record (for distributing into multiple SSL records), setting an SSL record type (within a header) to a custom type, etc. After the custom SSL records 216 are generated, the content provider enveloping proxy 204 transmits the custom SSL records 216 interleaved with the regular SSL records 215 over the data connection 206 and, thereby, transmits the meta-data and/or containers, in-band, to service provider enveloping proxy 202. Upon receiving regular SSL records 215 and custom SSL records 216 over data connection 206, service provider enveloping proxy 202 identifies which of the SSL records are regular SSL records and which of the SSL records are custom SSL records based on the SSL record type. The identifying is performed as is described with respect to the content provider enveloping proxy 204 in FIG. 2A. The service provider enveloping proxy 202 processes the SSL records to generate output 218 as is described with respect to the content provider enveloping proxy 204 generating output 212 in FIG. 2A. As is shown in FIGS. 2A and 2B, each enveloping proxy (202 in 204) may encode data into custom SSL records and/or extract data from received custom SSL records. The enveloping proxies are network devices that execute logic to perform the operations described with respect to figures one, 2A, and, and 2B. Exemplary logic for execution by one or more enveloping proxies (e.g., 108, 112, 202, and 204) is provided below.

Figure 3:
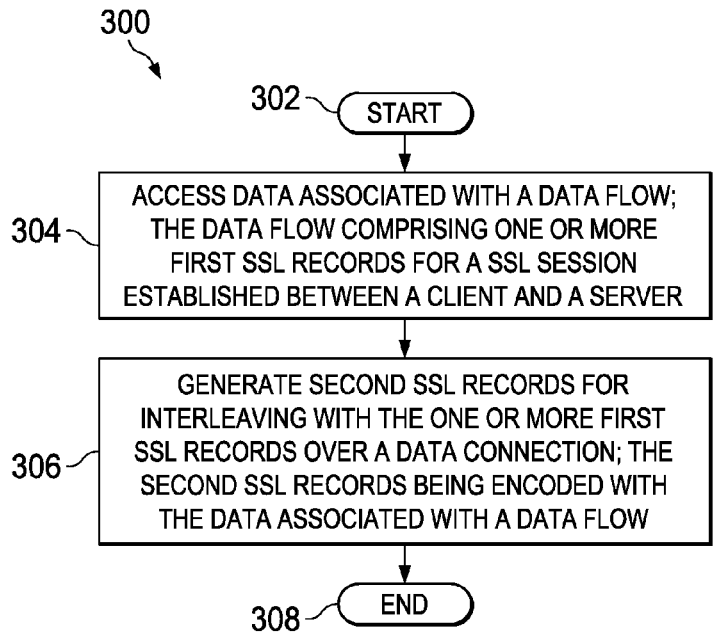
FIG. 3 illustrates exemplary logic for execution by an enveloping proxy according to some embodiments of the disclosure.

Turning to FIG. 3, FIG. 3 illustrates exemplary logic (logic 300) for execution by an enveloping proxy according to an embodiment of the present disclosure. Logic 300 includes start point 302; accessing data associated with a data flow, wherein the data flow comprises one or more first SSL records for a SSL session established between a client and a server, 304; generating second SSL records for transmission with the first SSL records in over a data connection session, the second SSL records being encoded with the data associated with the data flow, 306; and end point 308.

The logic 300 begins at 302 and advances to procedure 304 where the enveloping proxy accesses data associated with a data flow. The data flow comprises one or more first SSL records for a SSL session established between a client and a server. The data associated with the flow may be meta-data describing attributes of the data flow, attributes of network elements traversed by the data flow as it travels from the client to the server, or container (either opaque or transparent) for passing information to and/or from an application. As an example, this data may help a content provider to determine service parameters (e.g., quality of service, available bandwidth, and/or link capacity) for a customer that is attempting to access content from the client via a service provider network. Thus, the service provider may need to send the data to the content provider using the enveloping proxy. The enveloping proxy can access the data by retrieving the data from a memory (e.g., a database or server), receiving the data from a client device (e.g., a device requesting content), receiving the data from an application (e.g., a hosted application and/or or application running on the client device), receiving the data from a network component located in a content provider network, receiving the data from a network component located in a service provider network, and/or may be generated by observing the data flow. The one or more first SSL records may be regular SSL records. In some embodiments, the proxy receives both regular SSL records (e.g., the one or more first SSL records) and the data associated with the regular SSL records. In other embodiments, the enveloping proxy does not receive the regular SSL records and only receives the data associated with the regular SSL records.

After accessing the data associated with the data flow (the data), the enveloping proxy generates second SSL records to contain the data associated with the data flow at 306. The second SSL records may be custom SSL records as disclosed herein. The second SSL records are generated are for transmission with the first SSL records (e.g., interleaving custom SSL records with regular SSL records over a TCP connection). Because the data is encoded within second SSL records, the data can be transmitted, in-band, from a first network to a second network. In addition, the second SSL records can be transmitted with the first SSL records with out accessing the secure content of the regular SSL records. In some embodiments, the enveloping proxy generates the second SSL records to send to a third-party, which interleaves the second SSL records with regular SSL records. After generating the second SSL records 306, logic 300 advances to end point 308.

Start point 302 may coincide with a start point or an end point of other logic and/or procedures. In some examples, start point 302 is to initiate variables and/or data structures to be accessed by logic 300. End point 308 may coincide with a start point or and end point of other logic and/or procedures. The end point 308 may be used to de-allocate (or free from memory) any variables and/our data structures used in logic 300. In some embodiments, logic 300 is implemented by enveloping proxy 108, enveloping proxy 112, enveloping proxy 202, enveloping proxy 204, enveloping proxy 716, enveloping proxy 726, enveloping proxy 806, enveloping proxy 808, enveloping proxy 912, and/or enveloping proxy 926.

Figure 4:
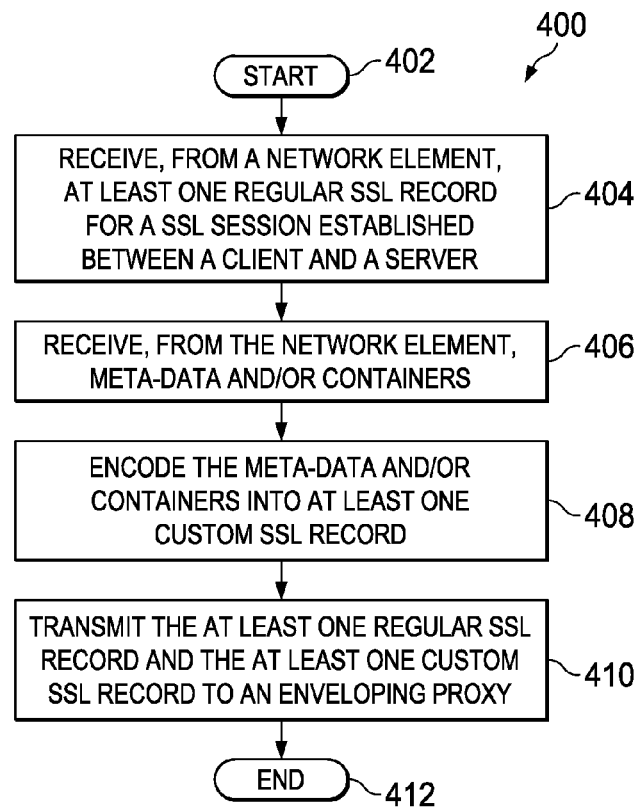
FIG. 4 illustrates another exemplary logic for execution by an enveloping proxy according to some embodiments of the disclosure.

Turning to FIG. 4, FIG. 4 illustrates exemplary logic (logic 400) for execution by an enveloping proxy according to an embodiment of the present disclosure. Logic 400 begins at start point 402 and advances to procedure 404 where at least one regular Secure Sockets Layer (SSL) record (regular SSL record) is received from a network element (e.g., a first enveloping proxy located in a first network) for a SSL session established between a client and a server. Because the SSL session is encrypted between the client and the server, the enveloping proxy cannot access the secure data within the regular SSL records. In other words, the enveloping proxy does not have access to the private key that is required to decrypt the regular SSL records and access the content encrypted therein. The regular SSL records correspond to a data flow between the client and the server (e.g., the data flow comprises the first SSL records).

After receiving the regular SSL records, logic 400 advances to procedure 406 where a meta-data and/or containers (i.e., data) are received from the network element (e.g., the first enveloping proxy located in the first network). The meta-data and/or containers are for transmission to another network (e.g., via one or more enveloping proxies). For example, a service provider may transmit the meta-data and/or containers from an enveloping proxy in the service provider's network to an enveloping proxy in a content provider network. Likewise, a content provider may transmit the meta-data and/or containers from an enveloping proxy in the content provider's network to an enveloping proxy in a service provider network. The meta-data and/or containers may be received from the same network element from which the regular SSL records were sent. Alternatively, the meta-data and/or containers may be received from a network element that is different from the network element that sent the regular SSL records. For example, the meta-data and/or containers are received from a system that monitors network statistics or network devices to report attributes of the network. In one example, the meta-data is associated with the data flow, subscriber, and/or device. In other words, the meta-data these data about the data flow. For example, the meta-data may be data about the data contained in the SSL records. In other examples the meta-data is data about the entire data flow and its attributes. In other examples, the data is about the network elements traversed by the data flow. In any case, the meta-data may be associated with the data flow (e.g., describe an attribute of the data flow) and therefore the regular SSL records. The meta-data and/or opaque containers can be received through any data connection. For example, the meta-data and/or container may be received through an out-of-band interface between an enveloping proxy and a server, a hosted application, and/or any network component capable of transmitting the meta-data and/or container.

At procedure 408, the meta-data and/or containers (i.e., the data received at procedure 406) are encoded into at least one second SSL record (custom SSL record). According to SSL Protocol (e.g., RFC 6101, The SSL Protocol Version 3.0), an SSL record contains an SSL record type, which is a numerical value that corresponds to the type of SSL record (e.g., 20=change_cipher_spec, 21=alert, 22=handshake, 23=application_data). The custom SSL records are encoded with a custom SSL type. For example, the encoding of the custom SSL records can comprise each of the custom SSL records having an SSL record type being a custom value (e.g., set by an enveloping proxy) that is not defined within SSL Protocol (e.g., the custom value is not 20, 21, 22, or 23, the custom value may be one value in the range 1-19, one value in the range greater than or equal to 24, or 99). The custom SSL records may be generated (e.g., encoded by the enveloping proxy) according to the SSL specification with the exception of the SSL record type, which is encoded with a custom value as described above. The secure contents (e.g., the payload) of the custom SSL records include the meta-data and/or containers received at procedure 406.

At procedure 410, the at least one regular SSL record and the at least one custom SSL record are transmitted to an enveloping proxy. In an embodiment, the at least one regular SSL record and the at least one custom SSL record are transmitted from a first enveloping proxy (located in a first network) to a second enveloping proxy (located in a second network). The transmission may occur over a single connection, such as a single TCP connection. The SSL records (i.e., the regular and custom SSL records) may be interleaved with one another. For example, the at least one regular SSL record and the at least one custom SSL record may be interleaved and transmitted over a data connection between the first enveloping proxy and the second enveloping proxy. Thus, the data is sent in-band (within the stream of SSL records) and does not require a special connection dedicated to sending meta-data and/or containers. Since the data flow contains its own meta-data, the transmission of the meta-data is not negatively affected by translation of 5-tuples (e.g., due to an NAT, load balancer or any other function/system that alters the 5-tuple). Moreover, transmitting the data in-band as disclosed herein does not rely on Internet Protocol (IP) or TCP header modification to carry meta-data. Thus, in-band data are resistant to NAT, application proxies, or firewalls present in the network. After transmitting the regular and SSL records, the logic 400 ends at end point 412.

Start point 402 may coincide with a start point or an end point of other logic and/or procedures. In some examples, start point 402 is to initiate variables and/or data structures to be accessed by logic 400. End point 412 may coincide with a start point or and end point of other logic and/or procedures. The end point 412 may be used to de-allocate (or free from memory) any variables and/our data structures used in logic 400.

Logic 400 is an exemplary implementation of logic 300. For example, procedure 304 corresponds to procedures 404 and 406; procedure 306 corresponds to procedures 408 and 410. In some embodiments, logic 400 is implemented by enveloping proxy 108, enveloping proxy 112, enveloping proxy 202, enveloping proxy 204, enveloping proxy 716, enveloping proxy 726, enveloping proxy 806, enveloping proxy 808, enveloping proxy 912, and/or enveloping proxy 926.

Figure 5:
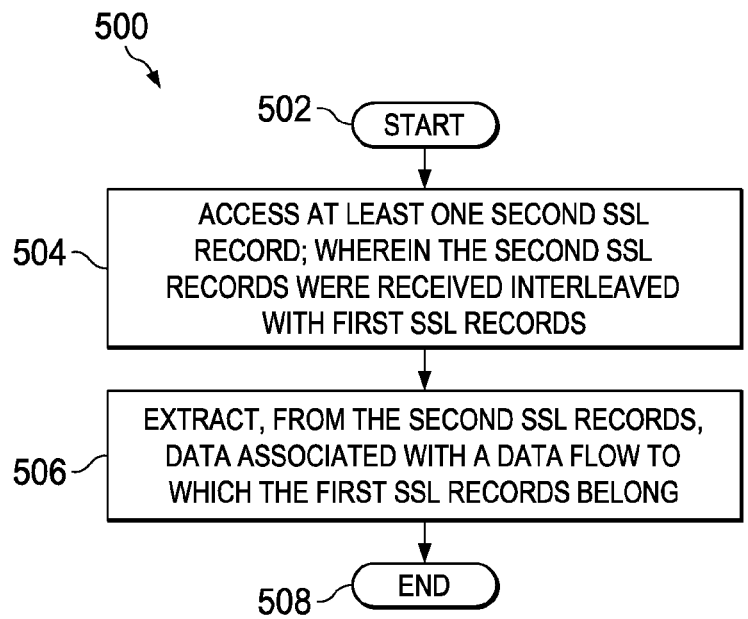
FIG. 5 illustrates yet another exemplary logic for execution by an enveloping proxy according to some embodiments of the disclosure.

Turning to FIG. 5, FIG. 5 illustrates exemplary logic (logic 500) for execution by an enveloping proxy according to an embodiment of the present disclosure. Logic 500 begins at start point 502 and advances to procedure 504. At procedure 504, at least second SSL record is accessed. The at least one second SSL record was received in a transmission (e.g., interleaved in a first SSL connection over a TCP connection) with first SSL records. In one example, an enveloping proxy directly receives the transmission of regular SSL records (i.e., the first SSL records) with the custom SSL records (i.e., the at least second SSL record). In other examples, the enveloping proxy does not directly receive the transmission of the regular SSL records with the custom SSL records and only receives the custom SSL records from an intermediate network component. For example, a third party may receive the regular SSL records interleaved with custom SSL records, parse the custom SSL records out of the interleaved data stream, and transmit the custom SSL records to the enveloping proxy. In either case, the enveloping proxy accesses (e.g., receives, retrieves, and the like) the custom SSL records.

At procedure 506, data are extracted from the at least one second SSL record. The data are associated with a data flow to which the first SSL records belong. The data may comprise meta-data, containers, or any data for an enveloping to transmit to another enveloping proxy. For example, a content provider application may be located in a service provider network. In this case, the application may be required to send the data (in custom SSL records) to an enveloping proxy in the content provider's network thereby allowing the content provider is able to monitor performance of the application within the service providers network. The data may, e.g., be any of: meta-data and/or containers for a service provider to send to a content provider, meta-data and/or containers for a content provider to send to a service provider, meta-data and/or containers for a content provider application (hosted in a service provider network) to send to a content provider, and/or meta-data and/or containers for a service provider application (hosted in a content provider network) to send to a service provider. In one example, the enveloping proxies establish a secure connection (e.g., a second SSL connection) between one another using the same TCP connection used to transmit the regular SSL records (e.g., an enveloping proxy in a first network and enveloping proxy in a second network). The enveloping proxies may inject additional SSL records to carry data, messages, etc. between one another thereby enabling in band transmission of data. Extracting the data can comprise decrypting the custom SSL records using a private key for the secure connection between the enveloping proxies. The first SSL records remain encrypted between the client and the server. After extracting the data, the logic 500 advances to end point 508.

Start point 502 may coincide with a start point or an end point of other logic and/or procedures. In some examples, start point 502 is to initiate variables and/or data structures to be accessed by logic 500. End point 508 may coincide with a start point or and end point of other logic and/or procedures. The end point 508 may be used to de-allocate (or free from memory) any variables and/our data structures used in logic 500. In some embodiments, logic 500 is implemented by enveloping proxy 108, enveloping proxy 112, enveloping proxy 202, enveloping proxy 204, enveloping proxy 716, enveloping proxy 726, enveloping proxy 806, enveloping proxy 808, enveloping proxy 912, and/or enveloping proxy 926.

Figure 6:
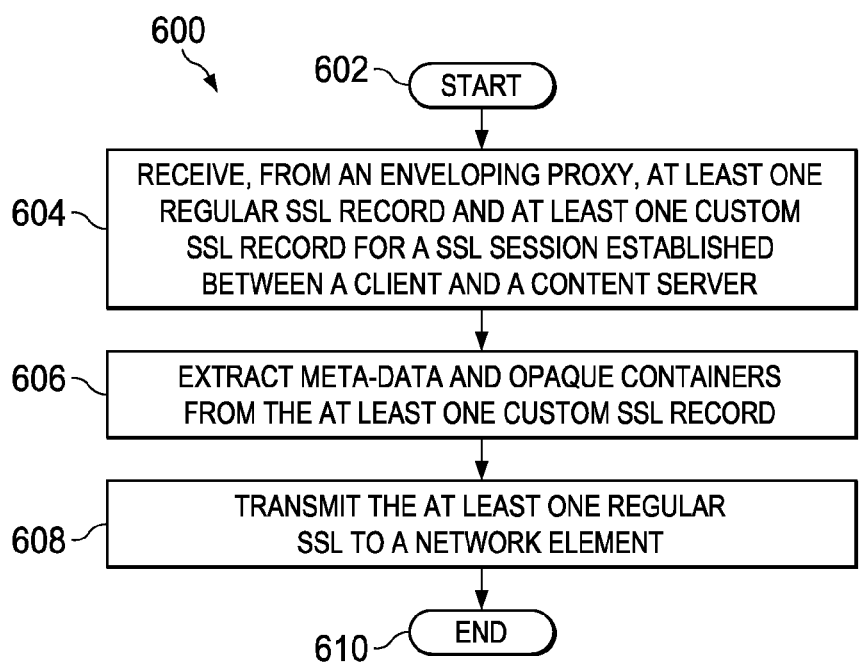
FIG. 6 illustrates further exemplary logic for execution by an enveloping proxy according to some embodiments of the disclosure.

Turning to FIG. 6, FIG. 6 illustrates exemplary logic (logic 600) for execution by an enveloping proxy according to an embodiment of the present disclosure. Logic 600 begins at start point 602 and advances to procedure 604 where an enveloping proxy receives at least one regular SSL record (regular SSL records) and at least one custom SSL record (custom SSL records) for a SSL session established between a client and a server. In an embodiment, the records are received by a first enveloping proxy located in a first network from a second enveloping proxy located in a second network. The regular SSL records and custom SSL records are sent over a data connection. In some examples, the regular and custom SSL records are received interleaved with one another. For example, a stream of SSL records may include a custom SSL records after every Nth regular SSL record (where N is a number greater than zero), a set of consecutive custom SSL records, a set of consecutive regular SSL records and/or combination thereof. Upon receiving the regular SSL records and custom SSL records (e.g., as a stream of SSL records), the enveloping proxy may not immediately know which SSL records are regular SSL records and which are custom SSL records. The enveloping proxy can identify the regular and the custom SSL based, at least in part, on a SSL record type in a header of each record. For example, the enveloping proxy may access each SSL record individually and compare the SSL record type to a list of regular type values and a list of custom type values. Upon determining that the SSL record type matches a regular SSL record type, the enveloping proxy may identify the SSL record as a regular SSL record. Upon determining that the SSL record type does not match a regular SSL record type, the enveloping proxy may identify the SSL record as a custom SSL record. Upon determining that the SSL record type matches a custom SSL record type, the enveloping proxy may identify the SSL record as a custom SSL record. Upon determining that the SSL record type does not match a custom SSL record type, the enveloping proxy may identify the SSL record as a regular SSL record. Thus, by inspecting the SSL record type, the enveloping proxy is able to distinguish the type of SSL record.

At procedure 606, the data is extracted (e.g., by a first enveloping proxy) from the at least one custom SSL. As discussed with reference to procedure 604, custom SSL records are identified, at least in part, based on the typed value of the SSL record. Those records identified as custom SSL records are used to transmit and/or receive data, containers, messages, etc. between networks. A private key (for a secure session between enveloping proxies) is used to decrypt the custom SSL records thereby allowing extraction of the data from the custom SSL records. The privately used to decrypt the custom SSL records is different from the private key used to decrypt the regular SSL records. This ensures that the security established between the client and the content server is maintained even though intermediate devices (e.g., enveloping proxies) can inject and extract custom SSL records into the stream of regular SSL records.

At procedure 608, the at least one regular SSL record is transmitted to a network element (e.g. the client or the server). Though the custom SSL records are decrypted (at procedure 606), the data in the regular SSL records remain encrypted. Thus, the enveloping proxy transmits the regular SSL records (unmodified) to the network element acting only as a proxy device that forwards the records. Thus, the enveloping proxy simultaneously forward the regular SSL records and extracts the data from the custom SSL records. After transmitting the regular SSL records to the network element, the logic 600 advances to end point 610.

In some embodiments, after extracting the data the custom SSL records, the enveloping proxy may take action based on the extracted data. For example, one action may be to transmit the extracted data (e.g., meta-data and/or containers). The data may be transmitted to the same network element to which the regular SSL records were transmitted or to another device. In other embodiment, the action is to call a function based on the extracted data (e.g., a function call to a service provider network to alter the service provided by the service provider). The action may be any of calling a function, executing a function, requesting a change in service provided by the service provider, transmitting the extracted data, storing a record in a database, or any combination thereof.

Start point 602 may coincide with a start point or an end point of other logic and/or procedures. In some examples, start point 602 is to initiate variables and/or data structures to be accessed by logic 600. End point 610 may coincide with a start point or and end point of other logic and/or procedures.

The end point 610 may be used to de-allocate (or free from memory) any variables and/our data structures used in logic 600.

Logic 600 is an exemplary implementation of logic 500. For example, procedure 504 may corresponds to procedure 604; procedure 506 may corresponds to procedures 606 and 608. In some embodiments, logic 600 is implemented by enveloping proxy 108, enveloping proxy 112, enveloping proxy 202, enveloping proxy 204, enveloping proxy 716, enveloping proxy 726, enveloping proxy 806, enveloping proxy 808, enveloping proxy 912, and/or enveloping proxy 926.

In some embodiments, a single device both encodes meta-data into custom SSL records and extracts meta-data received in other custom SSL records. In one example, a single device implements both logic 400 and logic 600. In another example, a single device implements both logic 300 and logic 500. In yet another example, a single device implements both logic 300 and logic 600. In yet other examples, a single device implements both logic or logic 500 and logic 400.

Figure 7:
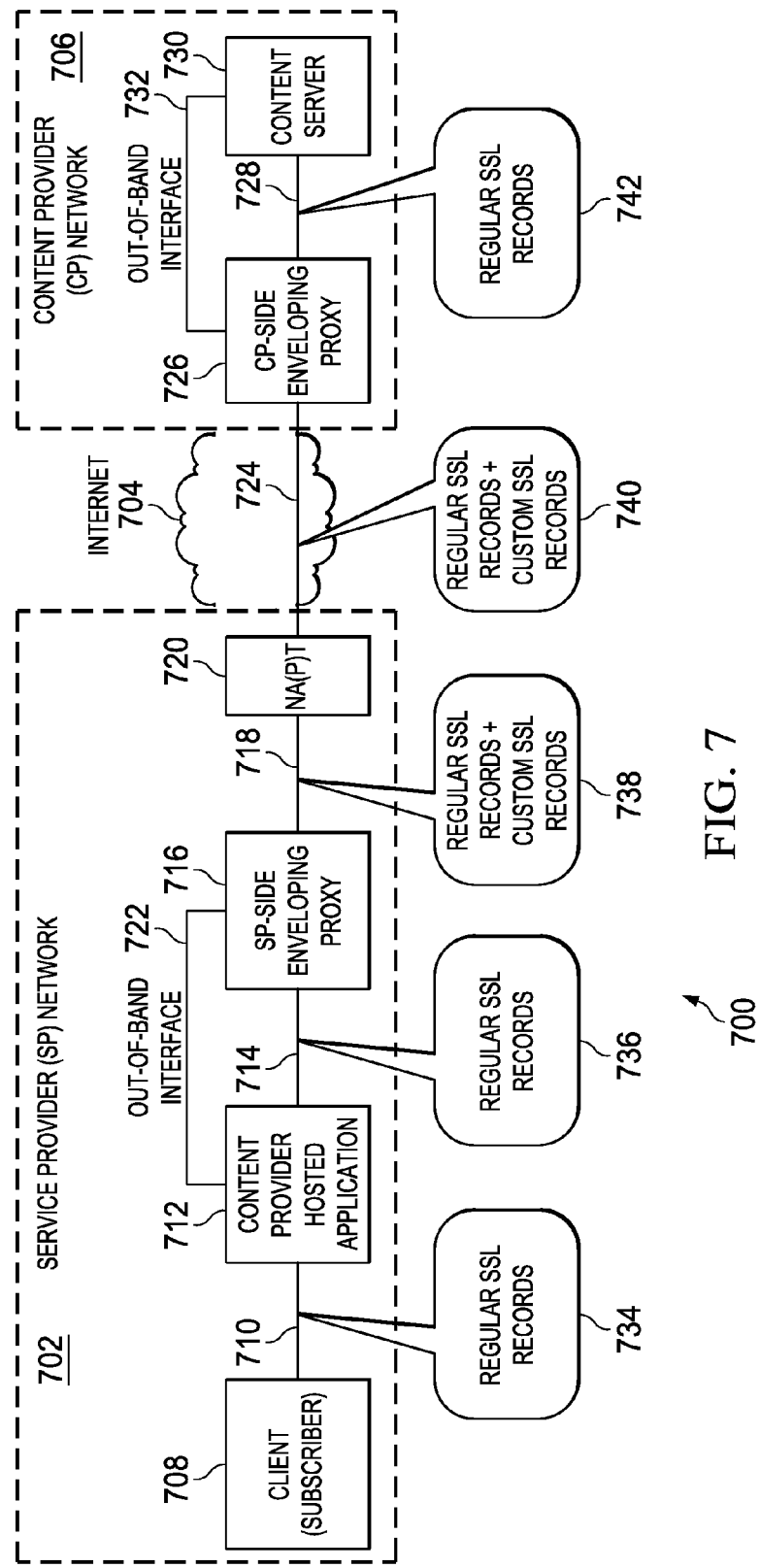
FIG. 7 is a simplified diagram of an illustrative system according to some embodiments of the disclosure.

FIG. 7 is a simplified diagram of an illustrative system (system 700) according to some embodiments of the disclosure. System 700 includes service provider network (SP) 702 and content provider (CP) network 706. Internet 704 operably couples the service provider network 702 to content provider network 706. The service provider network 702 comprises client (subscriber) 708, content provider host application 712, SP-side enveloping proxy 716, and NA(P)T 720. Client subscriber 708 is coupled to content provider hosted application 712 by data collection 710. In turn, content provider hosted application 712 is coupled to SP-side enveloping proxy 716 by data connection 714 and out-of-band interface 722. The out-of-band interface 722 is used to transmit data (e.g., meta-data and/or containers) between the content provider hosted application 712 and the SP-side enveloping proxy 716. The SP-side enveloping proxy 716 is coupled to NA(P)T 720 by data collection 718. The NA(P)T 720 is coupled to CP-side enveloping proxy 726 by data connection 724 over Internet 704. The NA(P)T 720 translates addresses between the service provider network 702 and the content provider network 706. Because the addresses are changed the NAT 720, a 5-tuple that the service provider uses to identify the flow is not the same as a 5-tuple used by the content provider to identify the flow. The content provider network 706 comprises CP-side enveloping proxy 726 and content server 730. CP-side enveloping proxy 726 is operably coupled to content server 730 by data connection 728 and out-of-band interface 732. The out-of-band interface 732 is used to transmit data (e.g., meta-data and/or containers) between the CP-side enveloping proxy 726 and the content server 730. An SSL session is established between client 708 and content server 730 via data connections 710, 714, 718, 724, and 728. The client 708 and the content server 730 use intermediate devices 712, 716, 720, and 726 to pass regular SSL records over the SSL session. The intermediate devices merely forward the regular SSL records and do not have access to the secure contents of the SSL records (e.g., cannot decrypt and/or do not have access to the private key needed to decrypt the content of the regular SSL records). Custom SSL records containing meta-data and/or containers can be piggy-backed onto the SSL session. For example, each of the enveloping proxies 716 and 726 can add custom SSL records to and extract custom SSL records from the SSL session. Data can be sent in either direction between the client 708 and the server 730 using the SSL session. The enveloping proxies 716 and 726 can transmit custom SSL records in either direction using the SSL session. For example, data may be sent from the client 708 to the server 730. Likewise, data may be sent from the server 730 to client 708.

The enveloping proxies 716 and 726 generate custom SSL records, which are used to transmit meta-data and/or containers related to a data flow between the client 708 and the content server 730. The custom SSL records are transmitted with (e.g., are piggybacked or interleaved with) the regular SSL records (e.g., the data flow). Because the meta-data and/or containers related to the data flow are transmitted in-band within the data flow, the meta-data and/or containers are resistant to NAT, application proxies, or firewalls present in service provider and/or content provider networks. The content provider hosted application 712 is hosted within service provider network 702 and, therefore, is under the administrative domain of the service provider. Because the content provider does not have administrative control of network 702 (in which the application 712 is located), the network elements within the content provider network 706 may not have access to meta-data regarding the performance of the content provider content provider hosted application (or performance the network components within network 702 traversed by data flows to and/or from the application 712). As a result, the content provider hosted application 712 may need to send meta-data to the content provider network 706 (e.g., to the content server 730). The data may include meta-data regarding the performance of the application, meta-data regarding the performance of the network in which it resides, general information about a client device (e.g., client 708) from which a data flow is received.

As described above, the SSL session is established between client 708 and content server 730 via data connections 710, 714, 718, 724, and 728. The client 708 and the content server 730 transmit regular SSL records between one another using the SSL session. For example, client 708 can send regular SSL records 734 to content provider hosted application 712. In turn, content provider hosted application 712 can send regular SSL records 736 to SP-side enveloping proxy 716. Because the content provider hosted application 712 must transmit additional data (e.g., meta-data, containers, etc.) to the content server 730, it does so by leveraging a data flow between SP-side enveloping proxy 716 and CP-side enveloping proxy 726 (which is a subset of the subscriber data flow). In this example, application 712 sends the additional data to SP-side enveloping proxy 716 using the out-of-band interface 722. Thus, the SP-side enveloping proxy receives not only the regular SSL records but also additional data for transmission to the content provider network. Upon receiving the data over the out-of-band interface 722, the SP-side enveloping proxy 716 encodes the data into custom SSL records. The service provider enveloping proxy forwards the regular SSL records and includes (e.g., interleaves) the custom SSL records in 738 over the connection 718. Thus, proxy 716 uses data connection 718 to transmit both the regular SSL records and the custom SSL records interleaved with one another to CP enveloping proxy 726 (via NAT 720). The NA(P)T 720 receives the regular SSL record and custom SSL records 738 and translates an address associated with the data flow. The NA(P)T 720 transmits the regular SSL record and custom SSL records 740 over connection 724 (via Internet 704) to CP-ide enveloping proxy 726. Upon receiving the regular SSL records and custom SSL records 740, enveloping proxy 726 identifies which records are the regular SSL records in which records are the custom SSL records. Upon identifying regular SSL records, enveloping proxy 726 forwards the regular SSL records 742 to content server 730 using data connection 728. Upon identifying custom SSL records, enveloping proxy 726 extracts the data from the custom SSL records. Enveloping proxy 726 they transmit the data (extracted from the custom SSL records) to the content server 730 over out-of-band interface 732. In this example, data was sent from the client (subscriber) 708 to the content server 730. As previously mentioned, data can be sent in either direction. Other data may be generated and sent in a similar fashion in a direction from content server 730 to client 708.

In this example, an out-of-band interface is used to transmit data from a component within the service provider network 702 to the service provider enveloping proxy 716. In addition, an out-of-band interface is used to transmit the extracted data (e.g., extracted from the custom SSL records) from enveloping proxy 726 to content server 730. In some embodiments, the out-of-band interfaces may not be present. For example, the service provider enveloping proxy 712 may be responsible for identifying the meta-data to be included within the custom SSL records (and therefore does not require the out-of-band interface to receive the data). No matter how the data are accessed by an enveloping proxy, the enveloping proxy injects the data into custom SSL records into a data flow for transmission with other SSL records.

As the data flow (i.e., between client 708 and content server 730) passes through the NA(P)T 720, the NA(P)T translates addresses associated with a data flow (i.e., a source/destination address a 5-tuple identifying the data flow). Because the NA(P)T translates the addresses, identifying the data flow by the 5-tuple is challenging. Transmitting the data in-band (as disclosed herein) addresses this challenge at least because it (1) does not rely on an address being passed between the entities and (2) is carried within the flow and therefore does not require independent identification using a 5-tuple. The systems and logic provided herein advantageously introduce additional (custom) SSL records to carry the meta-data within an existing connection used to carry other (regular) SSL records. The systems and methods herein also enable (e.g., an enveloping proxy) to extract in-band meta-data from a stream of SSL records (including regular and custom SSL records) while forwarding the regular SSL records.

Figure 8A:
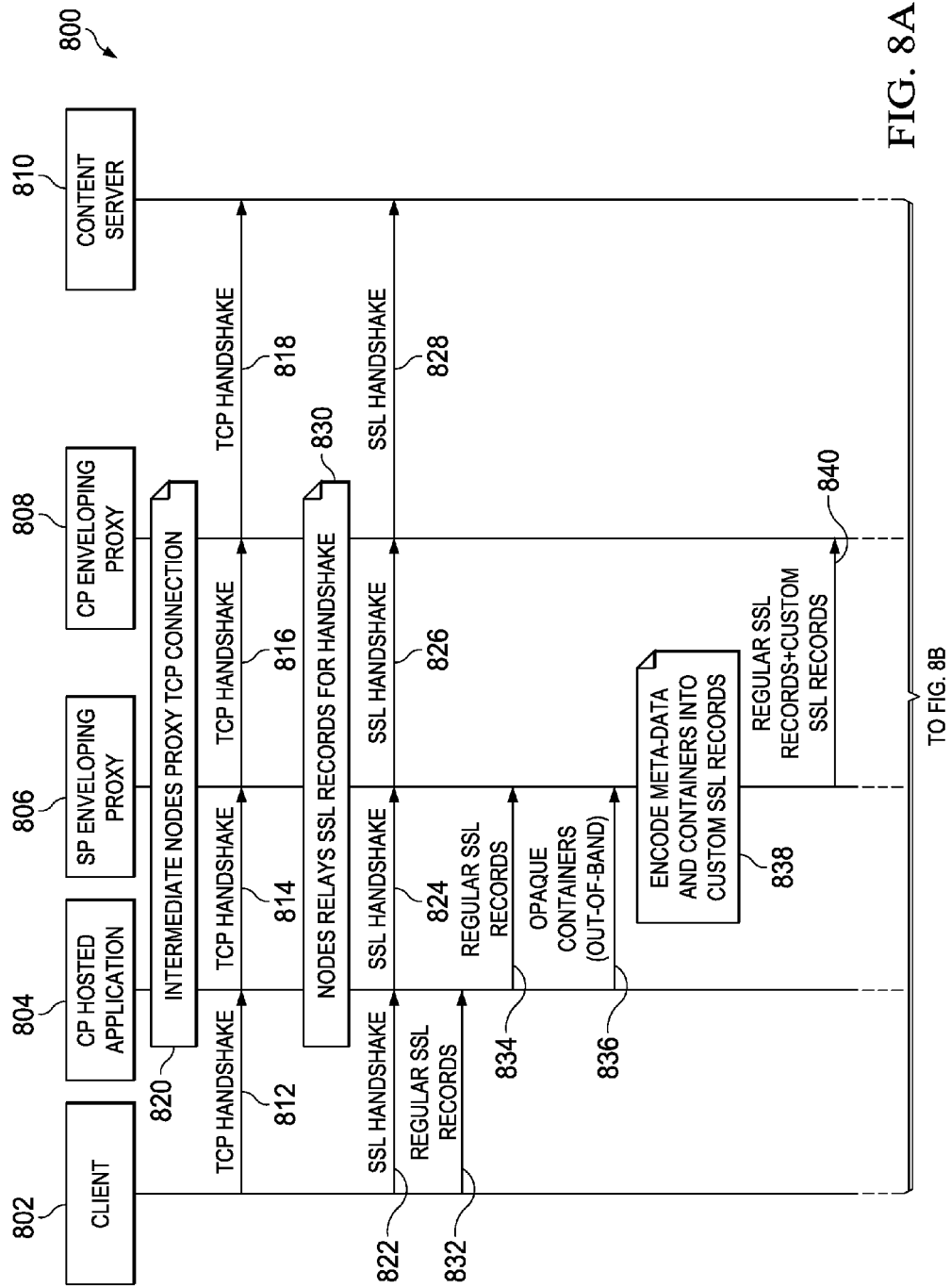
FIGS. 8A and 8B are a simplified messaging diagram for a system for communication between networks according to some embodiments of the disclosure.
Figure 8B:
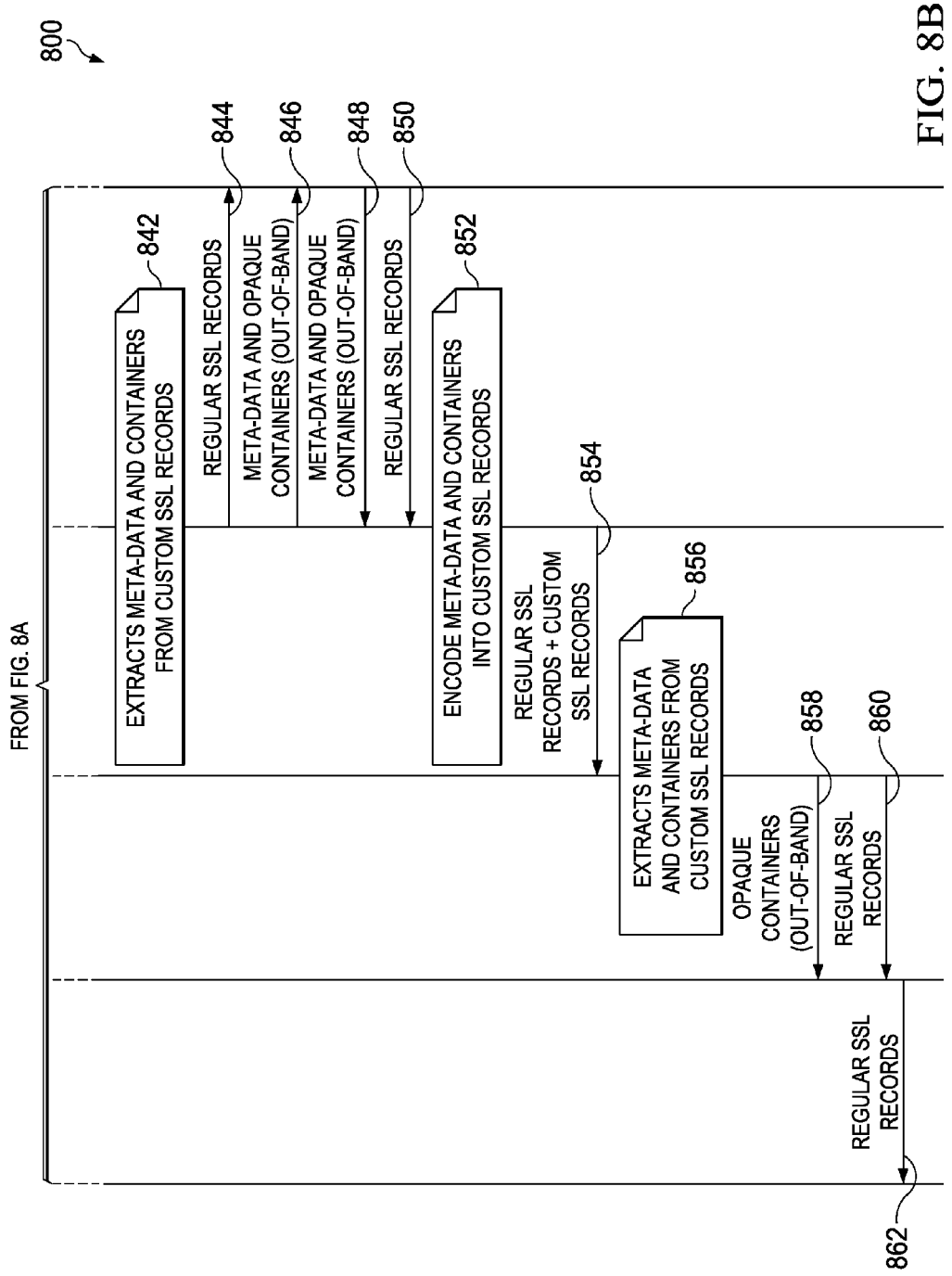

FIGS. 8A and 8B are a simplified messaging diagram for a system (system 800) for communication between networks according to an embodiment of the present disclosure. System 800 includes client 802, content provider (CP) hosted application 804, service provider (SP) enveloping proxy 806, CP enveloping proxy 808, and content server 810. Optionally, system 800 may include NAT, a load balancer, and/or any function or device that translates an address and/or a five-tuple associated with the data flow from to/from 802. The messaging diagram as shown in FIGS. 8A and 8B illustrate exemplary messages that may be transmitted between corresponding devices in system 700. SSL protocol defines a layer on top of Transport Control Protocol (TCP) that encrypts all the application data exchanged between the two endpoints of a TCP connection (in this case, client 802 and content server 810 are the endpoints). Upon TCP connection establishment (e.g., via TCP handshakes 812, 814, 816, and 818), the endpoints initiate a SSL handshake, by which they negotiate the encryption parameters to be used (e.g., via SSL handshakes 822, 824, 826, and 828). Each of CP hosted application 804, SP enveloping proxy 806, and CP enveloping proxy 808 is an intermediate node between client 802 and content server 810. Each of the intermediate nodes proxy the TCP connection (as indicated by 820 in FIG. 8A). In addition, each of the intermediate nodes relays SSL records for the SSL handshake (as indicated by 830 in FIG. 8A). Once the SSL handshake is completed, encrypted application data and other protocol-related information are exchanged. All the data exchanged within an SSL session are fragmented into basic units called SSL records. SSL records can be of different types and different size, however all record types include a common unencrypted header that specifies the particular type (i.e., SSL record type) and the size of the specific record. Client 802 transmits regular SSL records 832 to CH hosted application 804. The common unencrypted header in the regular SSL records include a SSL record type that is one that is defined in the SSL specification. In this example, the content provider enveloping proxy 804 transmits opaque containers 834 to SP enveloping proxy 806 using an out-of-band interface.

The content provider and the service provider define custom SSL record types, and exchange meta-data by embedding them into custom SSL records (or inversely, exchange meta-data through an out-of-band channel and embed subscriber data). Enveloping proxies 806 and 808 proxy connections (e.g., by terminating and reinitiating the Layer 4 (L4) transport between client 802 and content server 810). Each of enveloping proxies 806 and 808 may (1) inject custom SSL records (e.g., at 838 in FIG. 8A and at 852 in FIG. 8B) into one or more connections forming the subscriber session at one end, and (2) strip the custom SSL records (at 842 and at 856 in FIG. 8B) from the one or more connections at the other end. The custom SSL records may constitute a private communication channel between the enveloping proxies 806 and 808. The data sent in the custom SSL records can (1) carry arbitrary data (e.g., bits), specifically the meta-data as the case may be, and (2) be encrypted (e.g., using SSL) separately from the subscriber-encrypted SSL session. Accordingly, the regular SSL records are provided from the client 802 to the content server 810 (e.g., regular SSL records 832, regular SSL records 834, regular SSL records in 840, regular SSL records 844). At 838, service provider enveloping proxy 806 encodes the meta-data accessed from the SP network and opaque containers received from CP hosted application 804 into custom SSL records. At 840, the custom SSL records are piggy-backed onto the regular SSL records by the service provider enveloping proxy 806. When the service provider enveloping proxy 806 transmits the regular SSL records to the content provider enveloping proxy 808, the proxy 806 injects the custom SSL records into the transmission. Upon receiving the regular SSL records and custom SSL records, the content provider enveloping proxy 808 strips the custom SSL records from the connection and extracts the meta-data and containers (e.g., the opaque containers) from the custom SSL records at 842. The regular SSL records are transmitted from the content provider enveloping proxy 808 to the content server at 844. The data (meta-data and containers) extracted from the custom SSL records is transmitted (e.g., over an out-of-band interface) from enveloping proxy 808 to the content server at 846. It is noted that the custom SSL records that are inserted do not belong to the regular subscriber-encrypted SSL session (i.e., the regular SSL records) established between the client 802 and content server 810. In fact the custom SSL records may be transparently added and removed by the intermediate enveloping proxies (e.g., each of proxies 806 and 808) without affecting the operations of the (unmodified) SSL client (in this case client 802) and the (unmodified) content server 810.

Similar data flow can occur from the content server 810 to the client 802, where the content provider can provide information/signaling to the service provider. In the example of FIG. 8B, content server 810 transmits meta-data and opaque containers 848 to content provider enveloping proxy 808 using an out-of-band interface. The meta-data and/or opaque containers can include data for use in controlling, within the service provider's network, the data flow between client 802 and content server 810. For example, the meta-data and/or container may include service parameters for controlling a router in the servicer provider's network to increase a priority for packets in the data flow between the client 802 and the content server 810. In such a case, the packets may receive high priority in a queue of packets for routing by the router such that the packets are more likely to be transmitted relative to other packets in the queue. Thus, client's service can be "uplifted" based on the meta-data and/or container. A similar process for "downlifting" the server may occur by reducing a priority of packets for the data flow. The content server 810 may generate such a request/instruction to "uplift" or "downlift" service based on meta-data and/or containers received at 846. For example, the meta-data and/or containers received at 846 may include a current service parameter. The request/instruction can be to increase or decrease the service parameter. The content server 810 also transmits regular SSL records in 850 to content provider enveloping proxy 808 using the SSL session. In general, regular SSL records are provided from the content server 810 to the client 708 (e.g., regular SSL records 850, regular SSL records in 854, regular SSL records 860, and regular SSL records 862). At 852, content provider enveloping proxy 808 encodes, into custom SSL records, the meta-data and opaque containers received from content server 810. To allow information (e.g., meta-data and opaque containers received from content server 810 at 848) to be passed from the content provider network to the service provider network, custom SSL records are piggy-backed onto the regular SSL records at 852. At 854, the content provider enveloping proxy 808 transmits the regular SSL records and the piggy-backed custom SSL records to the service provider enveloping proxy 806. Upon receiving the regular SSL records and custom SSL records 854, the service provider enveloping proxy 806 strips the custom SSL records from the connection and extracts the meta-data and containers (e.g., the opaque containers) from the custom SSL records at 856. The data (containers) extracted from the custom SSL records are transmitted (over an out-of-band interface) from service provider enveloping proxy 806 to the content provider hosted application 804 at 858. In this case, the data may be used to control (e.g., set/modify variables, activate functions, and the like) the content provider hosted application 804. In some cases, the meta-data and/or containers include data for use in controlling, within the service provider's network, the data flow between the client 802 and the content server 810. In such a case, the enveloping proxy 806 may transmit the meta-data and/or container to another network component for application to data flow between the client 802 and the content server 810. For example, the enveloping proxy 806 may transmit the meta-data and/or container to a controller within the service provider's network, a router, or any other network component located within the service provider's network. In further cases, the enveloping proxy 806 may directly control the data flow, e.g., based on service parameters in the meta-data and/or container. A priority for packets in the data flow between the client 802 and the content server 810 may be increased based on the meta-data and/or container. Thus, the packets within the data flow may be transmitted (e.g., by the another network component and/or the enveloping proxy) with a higher priority relative to other packets in a queue based on the meta-data and/or container (or content therein). Thus, client's service can be "uplifted" based on the meta-data and/or container. A similar process for "downlifting" the server may occur by reducing a priority of packets for the data flow. The regular SSL records are transmitted from the service provider enveloping proxy 806 to the content provider hosted application 804 at 860. Finally, the regular SSL records are transmitted from the content provider hosted application 804 to the client 802 at 862. Again, it is important to note that the special SSL records (i.e., the custom SSL record) inserted do not belong to the regular subscriber-encrypted SSL session established between the end-points. In fact, such records may be transparently added and removed by the intermediate enveloping proxies (e.g., each of proxies 806 and 808) without affecting the operations of the (unmodified) SSL client and the (unmodified) content server.

The enveloping proxy in the service provider network uses the information received to activate the appropriate services requested by the content provider or, if needed, send such information to the content provider hosted application (e.g. by generating and transmitting REST messages). Note that data exchanged between content providers and content provider hosted applications in the service provider network are private; the data are not to be "understood" by the service provider. For this reason such data can be carried in containers that are encrypted by the content provider and thus be opaque to the service providers. These opaque containers are shown as, e.g., opaque containers (out-of-band) 836, and opaque containers (out-of-band) 858. The content of the opaque containers can be used to control the content provider hosted application 804. Opaque containers can include application specific information that a content provider exchanges with a content provider hosted application (e.g., hosted in a service provider's network). Examples can include session encryption keys sent by the content provider to allow the hosted application to modify the data in case of intermediate caches, content optimizers, etc. Another example of opaque containers can include subscriber policies that may influence the way the hosted application behaves.

Both, the communication between the enveloping proxy in the service provider and the content provider hosted application, and the communication between the enveloping proxy in the content provider and the actual content server, may take place through an out-of-band channel (such as a restful interface). Such out-of-band channels are possible since both ends of the communication are located on the same side of NA(P)T appliances and thus can use the 5-tuple to unequivocally identify data flows. Exemplary opaque communications over out-of-band channels are shown as opaque containers (out-of-band) 836, meta-data and opaque containers (out-of-band) 846, meta-data and opaque containers (out-of-band) 848, and opaque containers (out-of-band) 858.

Figure 9:
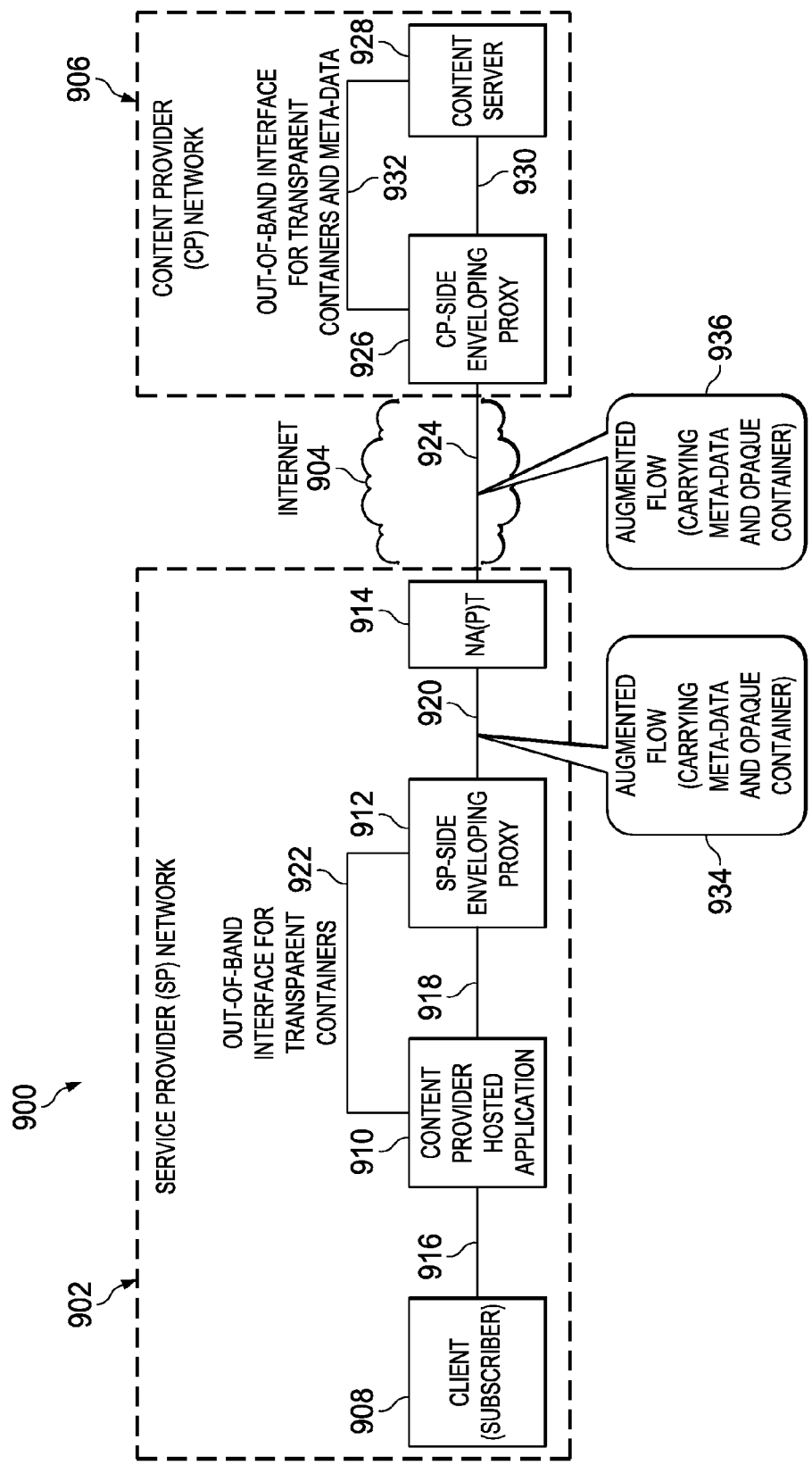
FIG. 9 is a simplified diagram of another illustrative system according to some embodiments of the disclosure.

FIG. 9 is a simplified diagram of another illustrative system (system 900) according to some embodiments of the disclosure. System 900 includes service provider network (SP) 902 and content provider (CP) network 906. Internet 904 operably couples the service provider network 902 to content provider network 906. The service provider network 902 comprises client (subscriber) 908, content provider host application 910, SP-side enveloping proxy 912, and NA(P)T 914. Client subscriber 908 is coupled to content provider hosted application 919 by data collection 916. In turn, content provider hosted application 919 is coupled to SP-side enveloping proxy 912 by data connection 918 and out-of-band interface 922. The out-of-band interface 922 is used to transmit data within transparent containers between the content provider hosted application 919 and the SP-side enveloping proxy 912. Transparent containers are data containers that are not encrypted (i.e., data sent "in the clear" such as cleartext) and thus the encrypted contents are transparent to (i.e., can be read or "understood" by) any system without the need to access to a decryption key for the container. A transparent container may contain meta-data. SP-side enveloping proxy is coupled to NA(P)T 914 by data collection 920. The NA(P)T 914 is coupled to CP-side enveloping proxy 926 by data connection 924 over Internet 924. The content provider network 906 comprises CP-side enveloping proxy 926 and content server 928. CP-side enveloping proxy 926 is operably coupled to content server 928 by and data connection 930 and out-of-band interface 932. The out-of-band interface 932 is used to transmit data within transparent containers between the CP-side enveloping proxy 926 and the content server 928.

This system shows that the flow is augmented between the SP-side enveloping proxy and the CP-side enveloping proxy. In this example, the service provider hosts an application for the content provider within its network. The hosted application 910 transmits data, in transparent containers, to enveloping proxy 912 located within the service provider network. The client 908 and the content server 928 have an SSL session for transmitting regular SSL records using intermediate devices 910, 912, 914, 926. The intermediate devices relay the regular SSL records (e.g., as described with respect of FIG. 7). In addition to relaying the regular SSL records, enveloping proxy 910 receives data (e.g., meta-data) within transparent containers, and transmits the data to CP-side enveloping proxy 926 using opaque containers. Opaque containers are data containers (e.g., for a block of data such as a sequence of bits) that are encrypted and thus the encrypted contents are opaque to (i.e., cannot be read or "understood" by) any system that does not have access to a decryption key (e.g., a private key) for the container. In other words, any system that does not have access to the decryption key can access (or "see") the data in encrypted form. The enveloping proxy 912 augments the regular flow of SSL records by injecting custom SSL records into the data flow. The augmented flow contains meta-data and opaque containers in addition to the regular SSL records. The augmented flow is transmitted from SP-enveloping proxy 912 to enveloping proxy 926 (via NA(P)T 914). Thus, the augmented flow 934 is transmitted from SP-enveloping proxy 912 to NA(P)T 914. NA(P)T 914 may modify a network address for the data flow and transmits the augmented flow 936 to CP-enveloping proxy 926. Enveloping proxy 926 extracts the meta-data and the opaque containers from the augmented flow. The meta-data and the data contained with the opaque containers are, in turn, transmitted from enveloping proxy 926 to server 928 over the out-of-band interface 932. The data contained with the opaque containers are transmitted using transparent containers. In this case, the data remains transparent while in the respective networks; however, the data is sent between the enveloping proxies using opaque containers (e.g., to reduce the likelihood of security breaches affecting the connection between the SP-side enveloping proxy 912 and the CP-side enveloping proxy 926). This system shows that the flow is augmented between the Service Provider SP-side enveloping proxy and the Content Provider (CP)-side enveloping proxy. This augmented flow (934 and 936) carries the custom SSL records and, thereby, allows meta-data to be transported easily in-band along with an SSL session.

Within the context of the disclosure, meta-data being exchanged between the content provider network and the service provider network can include subscriber related information sent from the mobile service provider to the content provider, e.g., subscriber charging attributes, location, identification, etc. Meta-data can include network related information related to the subscriber, e.g., radio access type, current QoS, network congestion, etc. Another type of meta-data can include remote procedure requests and/or replies, e.g., a content provider can request the mobile network to "uplift" or "downlift" mobile subscriber QoS, content provider can request specific information to be sent to the mobile service provider, etc. Meta-data may be transmitted within a container (e.g., an opaque container and/or a transparent container).

Opaque containers are data containers that are encrypted and thus the encrypted contents are opaque to (i.e., cannot be read or "understood" by) any system that does not have access to a decryption key (e.g., a private key) for the container. For example, data exchanged between content providers and content provider hosted applications in the service provider network are private; the data are not to be "understood" by the service provider. An opaque container (which id encrypted) may be transmitted within an existing encrypted session (e.g., an encrypted record nested within another encrypted record). Opaque containers can include application specific information that the content provider exchanges with the content provider hosted application. Examples can include session encryption keys sent by the content provider to allow the hosted application to modify the data in case of intermediate caches, content optimizers, etc. Another example of opaque containers can include subscriber policies that may influence the way the hosted application behaves. Transparent containers are data containers that are not encrypted (i.e., data sent "in the clear" such as cleartext) and thus the encrypted contents are transparent to (i.e., can be read or "understood" by) any system without the need to access to a decryption key for the container. An opaque container may contain meta-data.

A network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, the architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtual), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the in-band meta-information exchange operations between (mobile) service provider and content provider. This may be inclusive of appropriate algorithms and communication protocols that allow for the effective exchange of data or information.

As used herein in this Specification, the term 'client' is inclusive of devices used to initiate a communication, such as a computer, a personal digital assistant (PDA), a laptop or electronic notebook, a cellular telephone of any kind, an iPhone, an IP phone, a Blackberry, a Google Droid, an iPad, a tablet, or any other device, component, element, or object capable of initiating voice, audio, video, media, and/or data exchanges.

In one implementation, components (e.g., clients, service provider hosted application, service provider enveloping proxy, service provider enveloping proxy, content server, etc.) described herein may include software to achieve (or to foster) the functions discussed herein for in-band meta-information exchange between (mobile) service provider and content provider where the software is executed on one or more processors to carry out the functions. This could include the implementation of instances of clients, service provider hosted application, service provider enveloping proxy, service provider enveloping proxy, content server and/or any other suitable element that would foster the activities discussed herein. Additionally, each of these elements can have an internal structure (e.g., a processor, a memory element, etc.) to facilitate some of the operations described herein. In other embodiments, these functions for in-band meta-information exchange between (mobile) service provider and content provider may be executed externally to these elements, or included in some other network element to achieve the intended functionality. Alternatively, components may include software (or reciprocating software) that can coordinate with other network elements in order to achieve the in-band meta-information exchange between (mobile) service provider and content provider described herein. In still other embodiments, one or several devices may include any suitable algorithms, hardware, software, components, modules, interfaces, or objects that facilitate the operations thereof.

In certain example implementations, the in-band meta-information exchange mechanisms between (mobile) service provider and content provider outlined herein may be implemented by logic encoded in one or more non-transitory, tangible media (e.g., embedded logic provided in an application specific integrated circuit (ASIC), digital signal processor (DSP) instructions, software (potentially inclusive of object code and source code) to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases, meta-data, opaque containers, etc., to in-band meta-information exchange between (mobile) service provider and content provider. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, etc.) can include memory elements for storing information to be used in achieving in-band meta-information exchange between (mobile) service provider and content provider, as outlined herein. Additionally, each of these devices may include a processor that can execute software or an algorithm to perform the in-band meta-information exchange between (mobile) service provider and content provider as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of in-band meta-information exchange between (mobile) service provider and content provider, as potentially applied to a myriad of other architectures.

It is also important to note that the steps in the FIG. 1 illustrate only some of the possible scenarios that may be executed by, or within, the components (e.g., clients, service provider hosted application, service provider enveloping proxy, service provider enveloping proxy, content server, etc.) described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the components (e.g., clients, service provider hosted application, service provider enveloping proxy, service provider enveloping proxy, content server, etc.) in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the present disclosure.

What is claimed is:

1. A method for enabling in-band data exchange between a first network and a second network, the method comprising:
receiving, by a first enveloping proxy located in the first network, at least one regular secure sockets layer (SSL) record for a SSL session established between a client and a server, wherein the first enveloping proxy does not have access to a first key needed to decrypt the at least one regular SSL record;
receiving, by the first enveloping proxy, data from a network element located in the first network;
converting, by the first enveloping proxy, the data to a format for transmission in-band by encoding the data into at least one custom SSL record; and
transmitting, by a processor in the first enveloping proxy, the data in-band from the first network to the second network over the SSL session by:
interleaving ones of the at least one custom SSL record and ones of the least one regular SSL record to generate an interleaved data, the interleaved data being generating without decrypting the at least one regular SSL record, and
transmitting the interleaved data to a second enveloping proxy located in the second network, wherein the interleaved data is transmitted via a network component that is to translate a tuple identifying the interleaved data to an alternate tuple identifying the interleaved data, and wherein the second enveloping proxy has access to a second key needed to decrypt the at least one custom SSL record and does not have access to the first key needed to decrypt the at least one regular SSL record.

2. The method of claim 1, wherein encrypted data within the at least one regular SSL record is to be decrypted only by the server and the server has access to the first key needed to decrypt the at least one regular SSL record.

3. The method of claim 1, wherein the transmitting the interleaved data to the second enveloping proxy located in the second network comprises transmitting the interleaved data over a data connection between the first enveloping proxy and the second enveloping proxy.

4. The method of claim 1, wherein the receiving the data from the network element located in the first network comprises receiving the data over an out-of-band channel between the network element and the first enveloping proxy.

5. The method of claim 1, wherein the first network is a service provider network, the first enveloping proxy is a service provider enveloping proxy, the second network is a content provider network, the second enveloping proxy is a content provider enveloping proxy, and the server is a content server.

6. The method of claim 1, wherein the first network is a content provider network, the first enveloping proxy is a content provider enveloping proxy, the second network is a service provider network, the second enveloping proxy is a service provider enveloping proxy, and the server is a content server.

7. The method of claim 1, wherein the interleaved data is transmitted within a single data flow, and further comprising the tuple identifying the single data flow and the alternate tuple identifying the single data flow.

8. A system for enabling in-band data exchange between a first network and a second network, the system comprising:
at least one memory element;
at least one processor coupled to the at least one memory element; and
a data encoding module, on a first enveloping proxy, to interface with the at least one processor and further to:
receive at least one regular secure sockets layer (SSL) record for a SSL session established between a client and a server, wherein the first enveloping proxy does not have access to a first key needed to decrypt the at least one regular SSL record;
receive data from a network element located in the first network;
convert the data to a format for transmission in-band by encoding the data into at least one custom SSL record; and
transmit the data in-band from the first network to the second network over the SSL session by:
interleaving ones of the at least one custom SSL record and ones of the least one regular SSL record to generate an interleaved data, the interleaved data being generating without decrypting the at least one regular SSL record, and
transmitting the interleaved data to a second enveloping proxy located in the second network, wherein the interleaved data is transmitted via a network component that is to translate a tuple identifying the interleaved data to an alternate tuple identifying the interleaved data, and wherein the second enveloping proxy has access to a second key needed to decrypt the at least one custom SSL record and does not have access to the first key needed to decrypt the at least one regular SSL record.

9. The system of claim 8, wherein encrypted data within the at least one regular SSL record is to be decrypted only by the server and the server has access to the first key needed to decrypt the at least one regular SSL record.

10. The system of claim 8, wherein the transmitting the interleaved data to the second enveloping proxy located in the second network comprises transmitting the interleaved data over a data connection between the first enveloping proxy and the second enveloping proxy.

11. The system of claim 8, wherein the receiving the data from the network element located in the first network comprises receiving the data over an out-of-band channel between the network element and the first enveloping proxy.

12. The system of claim 8, wherein the first network is a service provider network, the first enveloping proxy is a service provider enveloping proxy, the second network is a content provider network, the second enveloping proxy is a content provider enveloping proxy, and the server is a content server.

13. The system of claim 8, wherein the first network is a content provider network, the first enveloping proxy is a content provider enveloping proxy, the second network is a service provider network, the second enveloping proxy is a service provider enveloping proxy, and the server is a content server.

14. The system of claim 8, wherein the interleaved data is transmitted within a single data flow, and further comprising the tuple identifying the single data flow and the alternate tuple identifying the single data flow.

15. One or more non-transitory tangible media for enabling in-band data exchange between a first network and a second network, the one or more non-transitory tangible media including code for execution and when executed by a processor operable to perform operations comprising:
receiving, by a first enveloping proxy located in the first network, at least one regular secure sockets layer (SSL)

record for a SSL session established between a client and a server, wherein the first enveloping proxy does not have access to a first key needed to decrypt the at least one regular SSL record;

receiving, by the first enveloping proxy, data from a network element located in the first network;

converting, by the first enveloping proxy, the data to a format for transmission in-band by encoding the data into at least one custom SSL record; and transmitting, by a processor in the first enveloping proxy, the data in-band from the first network to the second network over the SSL session by:

interleaving ones of the at least one custom SSL record and ones of the least one regular SSL record to generate an interleaved data, the interleaved data being generating without decrypting the at least one regular SSL record, and transmitting the interleaved data to a second enveloping proxy located in the second network, wherein the interleaved data is transmitted via a network component that is to translate a tuple identifying the interleaved data to an alternate tuple identifying the interleaved data, and wherein the second enveloping proxy has access to a second key needed to decrypt the at least one custom SSL record and does not have access to the first key needed to decrypt the at least one regular SSL record.

16. The one or more non-transitory tangible media of claim 15, wherein encrypted data within the at least one regular SSL record is to be decrypted only by the server and the server has access to the first key needed to decrypt the at least one regular SSL record.

17. The one or more non-transitory tangible media of claim 15, wherein the transmitting the interleaved data to the second enveloping proxy located in the second network comprises transmitting the interleaved data over a data connection between the first enveloping proxy and the second enveloping proxy.

18. The one or more non-transitory tangible media of claim 15, wherein the receiving the data from the network element located in the first network comprises receiving the data over an out-of-band channel between the network element and the first enveloping proxy.

19. The one or more non-transitory tangible media of claim 15, wherein the first network is a service provider network, the first enveloping proxy is a service provider enveloping proxy, the second network is a content provider network, the second enveloping proxy is a content provider enveloping proxy, and the server is a content server.

20. The one or more non-transitory tangible media of claim 15, wherein the first network is a content provider network, the first enveloping proxy is a content provider enveloping proxy, the second network is a service provider network, the second enveloping proxy is a service provider enveloping proxy, and the server is a content server.

21. The one or more non-transitory tangible media of claim 15, wherein the interleaved data is transmitted within a single data flow, and further comprising the tuple identifying the single data flow and the alternate tuple identifying the single data flow.

\* \* \* \* \*